(12) United States Patent
Kiyokami

(10) Patent No.: US 12,208,931 B2
(45) Date of Patent: Jan. 28, 2025

(54) PACKAGE SUPPORTING DEVICE AND UNMANNED PACKAGE TRANSPORTER

(71) Applicant: TOYOTA JIDOSHA KABUSHIKI KAISHA, Aichi-ken (JP)

(72) Inventor: Hiroaki Kiyokami, Nisshin (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 1 day.

(21) Appl. No.: 18/317,103

(22) Filed: May 15, 2023

(65) Prior Publication Data

US 2023/0373665 A1    Nov. 23, 2023

(30) Foreign Application Priority Data

May 20, 2022  (JP) ................................. 2022-083382

(51) Int. Cl.
*B64U 60/40* (2023.01)
*B64U 60/50* (2023.01)
*B64U 101/64* (2023.01)

(52) U.S. Cl.
CPC ............. *B64U 60/40* (2023.01); *B64U 60/50* (2023.01); *B64U 2101/64* (2023.01)

(58) Field of Classification Search
CPC .... B64U 60/40; B64U 60/50; B64U 2101/64; B64U 2101/66; B64U 2101/60; B64C 2101/00
See application file for complete search history.

(56) References Cited

U.S. PATENT DOCUMENTS

| 5,868,357 A * | 2/1999 | Gabriel ................... B64D 1/22 |
| | | 294/907 |
| 6,179,357 B1 * | 1/2001 | Gabriel ................... B66C 1/28 |
| | | 294/902 |
| 11,345,051 B2 * | 5/2022 | Zheng ...................... B64D 9/00 |
| 2021/0171195 A1 | 6/2021 | Yamato et al. |
| 2023/0091849 A1 * | 3/2023 | Wong .................... B64C 39/024 |
| | | 244/137.4 |
| 2023/0211883 A1 * | 7/2023 | Lu .............................. B66D 3/24 |
| | | 254/342 |
| 2023/0331386 A1 * | 10/2023 | Parraga .................... B66D 5/34 |

FOREIGN PATENT DOCUMENTS

| JP | 2022-190972 A | 12/2022 |
| WO | 2020/194533 A1 | 10/2020 |
| WO | 2020/217662 A1 | 10/2020 |

* cited by examiner

*Primary Examiner* — Tien Q Dinh
*Assistant Examiner* — William L Gmoser
(74) *Attorney, Agent, or Firm* — HAUPTMAN HAM, LLP

(57) ABSTRACT

A package supporting device including: a base; ground contacting portions that contact a landing surface in a state of having landed; package supporting portions provided at an underside of the base, the package supporting portions supporting a package; a drive portion that is operable in a first state to cause each of the package supporting portions to move toward the package, and is operable in a second state to cause each of the package supporting portions to move away from the package; and a restricting portion that is provided independently from the drive portion, and that allows operation of the drive portion in a state in which the ground contacting portions are contacting a landing surface, and, in a state in which the ground contacting portions do not contact a landing surface, restricts operation of the drive portion in at least the second state.

6 Claims, 25 Drawing Sheets

PACKAGE SUPPORTING DEVICE AND UNMANNED PACKAGE TRANSPORTER

CROSS-REFERENCE TO RELATED APPLICATION

This application is based on and claims priority under 35 USC 119 from Japanese Patent Application No. 2022-083382 filed on May 20, 2022, the disclosure of which is incorporated by reference herein.

BACKGROUND

Technical Field

The present disclosure relates to a package supporting device and an unmanned package transporter.

Related Art

International Publication (WO) No. 2020/194533 discloses a transporting device that supports a container or the like below a small unmanned aerial vehicle and transports the container or the like.

Incidentally, as in the transporting device described in International Publication (WO) No. 2020/194533, in a transporting device that transports packages by flying, it is desirable to be able to prevent or suppress dropping of packages during flight.

SUMMARY

In consideration of the above circumstances, an object of the present disclosure is to provide a package supporting device and an unmanned package transporter which are capable of preventing or suppressing dropping of packages during flight.

A package supporting device according to a first aspect includes: a base, a small unmanned aerial vehicle being attached to an upper portion of the base; plural ground contacting portions that are configured to contact a landing surface in a state of having landed; plural package supporting portions provided at an underside of the base, the package supporting portions supporting a package; a drive portion that is operable in a first state to cause each of the package supporting portions to move toward the package, and is operable in a second state to cause each of the package supporting portions to move away from the package; and a restricting portion that is provided independently from the drive portion, that allows operation of the drive portion in a state in which the ground contacting portions are contacting a landing surface, and, in a state in which the ground contacting portions do not contact a landing surface, restricts operation of the drive portion in at least the second state.

In the package supporting device according to the first aspect, in a case in which the ground contacting portions are contacting a landing surface, the package supporting portions move toward the package when the drive portion is operated in the first state. This enables the package to be supported by the package supporting portions. Moreover, in a case in which the ground contacting portions are contacting a landing surface, the package supporting portions move away from the package when the drive portion is operated in the second state. This enables the package to be moved away from the package supporting portions. In a state in which the ground contacting portions are contacting a landing surface, the restricting portion allows operation of the drive portion. On the other hand, in a state in which the ground contacting portions are not contacting a landing surface, the restricting portion restricts operation of the drive portion in at least the second state. This enables the movement of the package supporting portions away from the package to be prevented or suppressed in a state in which the ground contacting portions are not contacting a landing surface. As a result, dropping of the package during flight can be prevented or suppressed.

A package supporting device according to a second aspect is the package supporting device according to the first aspect, wherein: the restricting portion includes: a drive-portion-side restricting portion that is displaceable between a first position that restricts operation of the drive portion in at least the second state, and a second position that allows operation of the drive portion, a ground-contacting-portion-side restricting portion that is provided at one of the ground contacting portions, and a connecting portion that connects the drive-portion-side restricting portion and the ground-contacting-portion-side restricting portion; in a case in which the ground-contacting-portion-side restricting portion contacts a landing surface, the connecting portion displaces, and the drive-portion-side restricting portion displaces from the first position to the second position; and in a case in which the ground-contacting-portion-side restricting portion does not contact a landing surface, the connecting portion displaces, and the drive-portion-side restricting portion displaces from the second position to the first position.

In the package supporting device according to the second aspect, in a case in which the ground-contacting-portion-side restricting portion contacts a landing surface, the connecting portion displaces, and the drive-portion-side restricting portion displaces from the first position to the second position. In a state in which the drive-portion-side restricting portion is positioned at the second position, the restricting portion allows operation of the drive portion. On the other hand, in the case in which the ground-contacting-portion-side restricting portion does not contact a landing surface, the connecting portion displaces, and the drive-portion-side restricting portion displaces from the second position to the first position. In a state in which the drive-portion-side restricting portion is positioned at the first position, the restricting portion restricts operation of the drive portion in at least the second state. This enables dropping of the package during flight to be prevented or suppressed.

A package supporting device according to a third aspect is the package supporting device according to the second aspect, further including a biasing member that continuously biases the drive-portion-side restricting portion toward the first position.

In the package supporting device according to the third aspect, the drive-portion-side restricting portion is continuously biased toward the first position by the biasing member. This enables dropping of the package during flight to be prevented or suppressed even in a case in which, for example, an operational failure arises at the ground-contacting-portion-side restricting portion or the connecting portion.

A package supporting device according to a fourth aspect is the package supporting device according to the second aspect, wherein: the drive-portion-side restricting portion includes a pressing portion that is pressed against a member configuring the drive portion in a state in which the drive-portion-side restricting portion is positioned at the first position; and operation of the drive portion is restricted by the pressing portion being pressed against the member configuring the drive portion.

In the package supporting device according to the fourth aspect, the pressing portion of the drive-portion-side restricting portion is pressed against the member configuring the drive portion, enabling operation of the drive portion to be restricted.

A package supporting device according to a fifth aspect is the package supporting device according to the second aspect, wherein: the drive-portion-side restricting portion includes plural first ratchet teeth that protrude toward the drive portion; the drive portion includes plural second ratchet teeth that protrude toward the drive-portion-side restricting portion and that engage with the plural first ratchet teeth of the drive-portion-side restricting portion positioned at the first position; in a state in which the plural first ratchet teeth and the plural second ratchet teeth are engaged with each other, operation of the drive portion in the second state is restricted; and in a case in which the drive portion is in the first state in the state in which the plural first ratchet teeth and the plural second ratchet teeth are engaged with each other, operation of the drive portion in the first state is allowed by the plural second ratchet teeth moving over the plural first ratchet teeth.

In the package supporting device according to the fifth aspect, the plural first ratchet teeth of the drive-portion-side restricting portion and the plural second ratchet teeth of the drive portion are engaged with each other, enabling operation of the drive portion in the second state to be restricted. Moreover, even if the plural first ratchet teeth of the drive-portion-side restricting portion and the plural second ratchet teeth of the drive portion are engaged with each other, operation of the drive portion in the first state can be allowed.

A package supporting device according to a sixth aspect is the package supporting device according to the second aspect, wherein: the drive-portion-side restricting portion includes: a fixed cam portion that is non-movable with respect to the base, a movable cam portion that is connected to the connecting portion and is displaceable with respect to the base, and an insertion portion that protrudes from the drive portion and that is inserted through the fixed cam portion and the movable cam portion; in a state in which the movable cam portion is disposed at a position at which movement of the insertion portion is restricted by the fixed cam portion and the movable cam portion, operation of the drive portion is restricted; and in a state in which the movable cam portion is disposed at a position at which the insertion portion is movable along the fixed cam portion and the movable cam portion, operation of the drive portion is allowed.

In the package supporting device according to the sixth aspect, by the movable cam portion being disposed at a position at which movement of the insertion portion of the drive portion is restricted by the fixed cam portion and the movable cam portion, operation of the drive portion can be restricted. On the other hand, by the movable cam portion being disposed at a position at which the insertion portion of the drive portion can move along the fixed cam portion and the movable cam portion, operation of the drive portion can be allowed.

An unmanned package transporter according to a seventh aspect includes: a small unmanned aerial vehicle; a base, the small unmanned aerial vehicle being attached to an upper portion of the base; plural ground contacting portions that are configured to contact a landing surface in a state of having landed; plural package supporting portions provided at an underside of the base, the package supporting portions supporting a package; a drive portion that is operable in a first state to cause each of the package supporting portions to move toward the package, and is operable in a second state to cause each of the package supporting portions to move away from the package; and a restricting portion that is provided independently from the drive portion, that allows operation of the drive portion in a state in which the ground contacting portions are contacting a landing surface, and, in a state in which the ground contacting portions do not contact a landing surface, restricts operation of the drive portion in at least the second state.

The unmanned package transporter according to the seventh aspect enables a package, which is supported, to be transported by a small unmanned aerial vehicle flying. Moreover, in the unmanned package transporter according to the seventh aspect, in a case in which the ground contacting portions contact a landing surface, the package supporting portions move toward the package when the drive portion is operated in the first state. This enables the package to be supported by the package supporting portions. Moreover, in a case in which the ground contacting portions contact a landing surface, the package supporting portions move away from the package when the drive portion is operated in the second state. This enables the package to be moved away from the package supporting portions. In a state in which the ground contacting portions are contacting a landing surface, the restricting portion allows operation of the drive portion. On the other hand, in a state in which the ground contacting portions are not contacting a landing surface, the restricting portion restricts operation of the drive portion in at least the second state. This enables the movement of the package supporting portions away from the package to be prevented or suppressed in a state in which the ground contacting portions are not contacting a landing surface. As a result, dropping of the package during flight can be prevented or suppressed.

Effect of the Invention

The package supporting device and the unmanned package transporter according to the present disclosure have the excellent advantageous effect of being able to prevent or suppress dropping of packages during flight.

BRIEF DESCRIPTION OF THE DRAWINGS

Exemplary embodiments of the present disclosure will be described in detail based on the following figures, wherein.

DETAILED DESCRIPTION

Explanation follows regarding an unmanned package transporter 10 according to exemplary embodiments of the present disclosure, with reference to FIG. 1 to FIG. 6.

Figure 1:
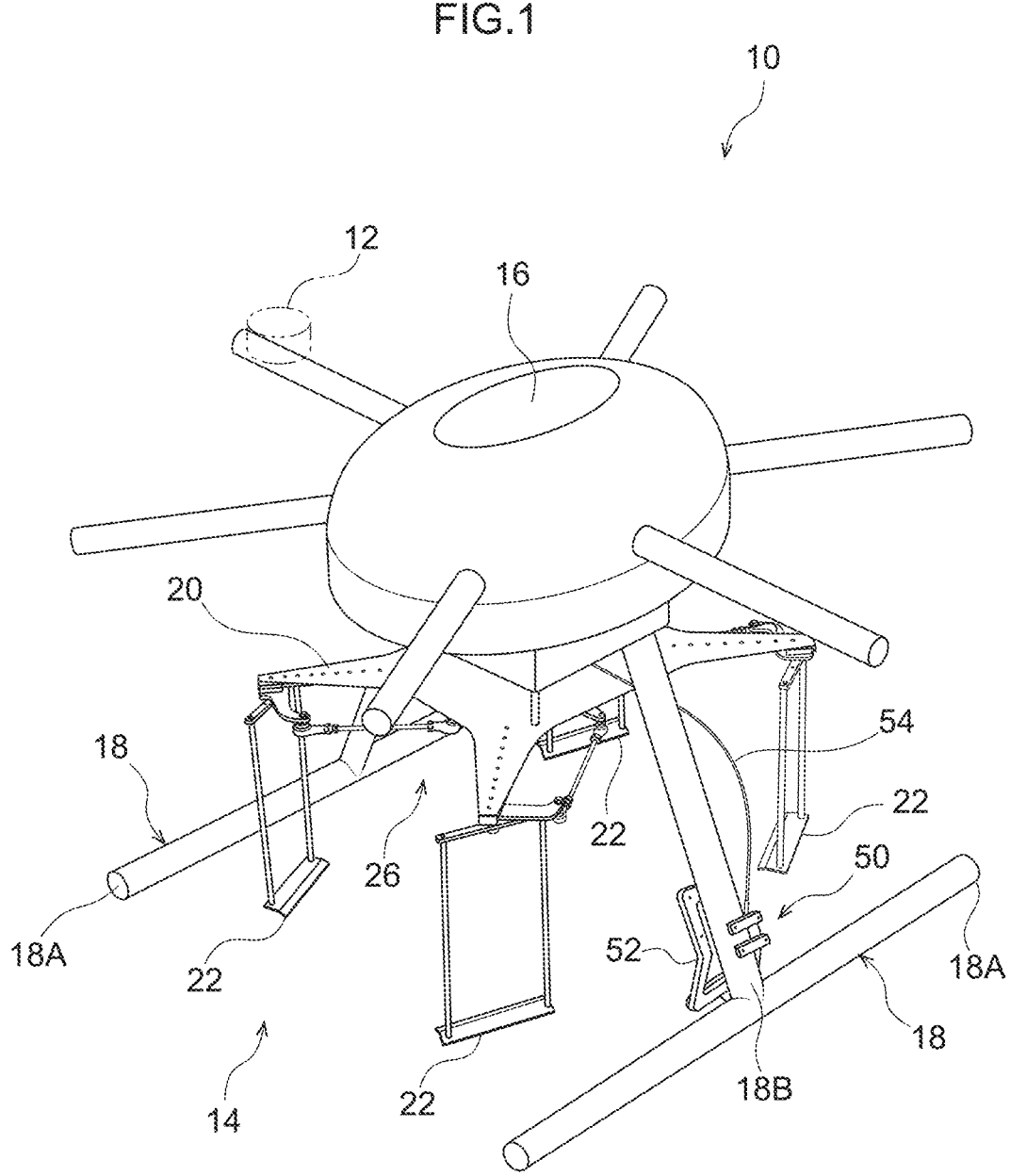
FIG. 1 is a perspective view illustrating an unmanned package transporter.
Figure 2:
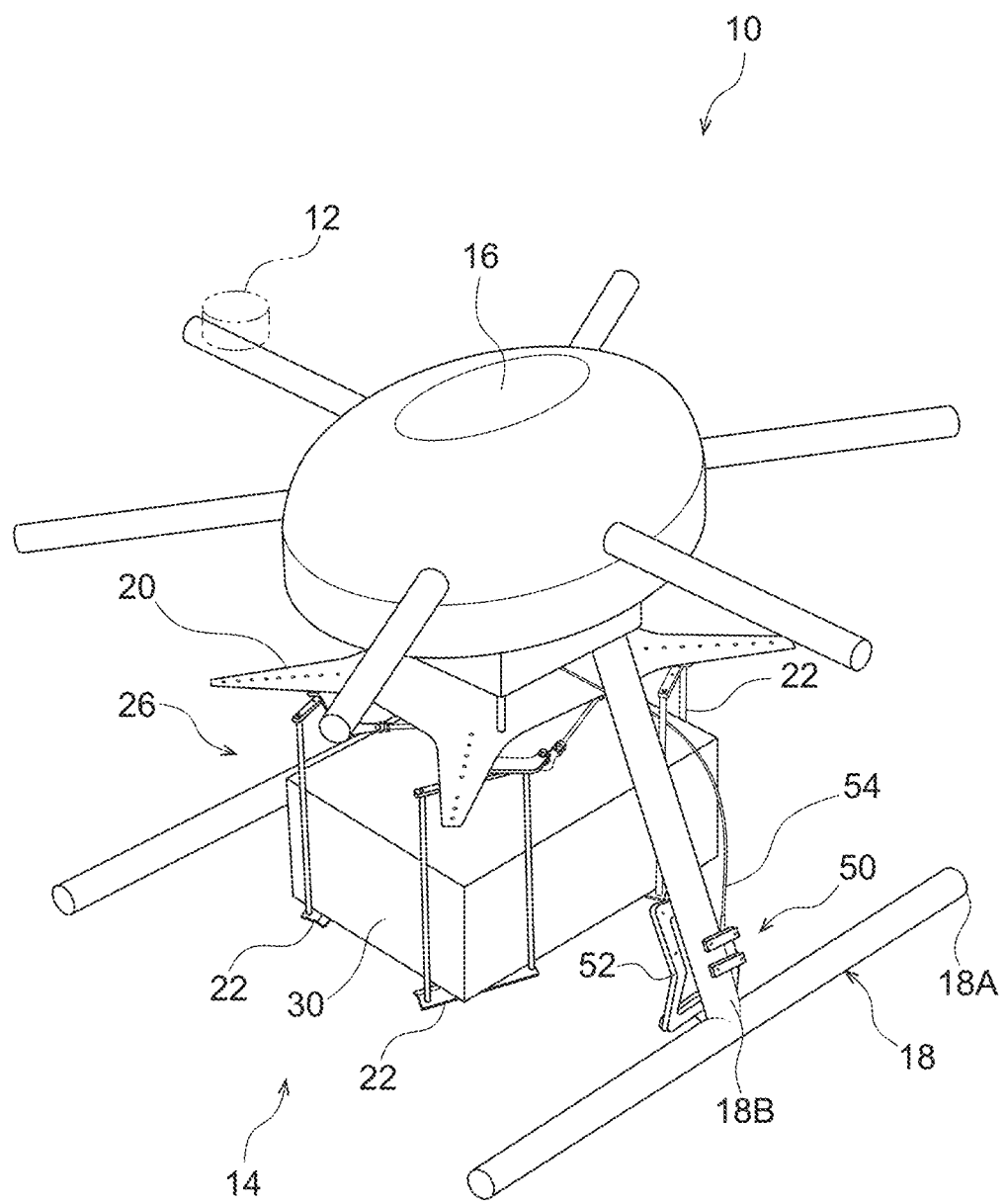
FIG. 2 is a perspective view illustrating an unmanned package transporter, and illustrates a state in which a package supporting device is supporting a package.

As illustrated in FIG. 1 and FIG. 2, the unmanned package transporter 10 of the present exemplary embodiment includes a small unmanned aerial vehicle 12 and a package supporting device 14 attached to an underside of the small unmanned aerial vehicle 12.

As illustrated in FIG. 1, FIG. 3, FIG. 4, and FIG. 5, the package supporting device 14 includes an aerial vehicle fixing portion 16 to which the small unmanned aerial vehicle 12 is fixed, and a pair of ground contacting portions 18 that contact a landing surface in a state of having landed. Note that in the present exemplary embodiment, six small unmanned aerial vehicles 12 are fixed to the aerial vehicle fixing portion 16. The pair of ground contacting portions 18 each include a ground contacting portion main body 18A that extends in a horizontal direction and contacts a landing surface, and a central leg portion 18B that extends upward from a central portion in a longitudinal direction of the ground contacting portion main body 18A. An upper end portion of the central leg portion 18B is connected to a lower portion of the aerial vehicle fixing portion 16. Note that a landing surface is a surface on which the unmanned package transporter 10 lands, and is a ground surface, a drone port, a vehicle roof, a loading platform, or the like.

The package supporting device 14 further includes a plate 20 serving as a base disposed at an underside of the aerial vehicle fixing portion 16 and connected to the aerial vehicle fixing portion 16. In addition, the package supporting device 14 includes four leg portions 22 serving as package supporting portions, four linear guides 24 serving as first supporting portions, a linkage mechanism 26, and an actuator 28.

Figure 3:
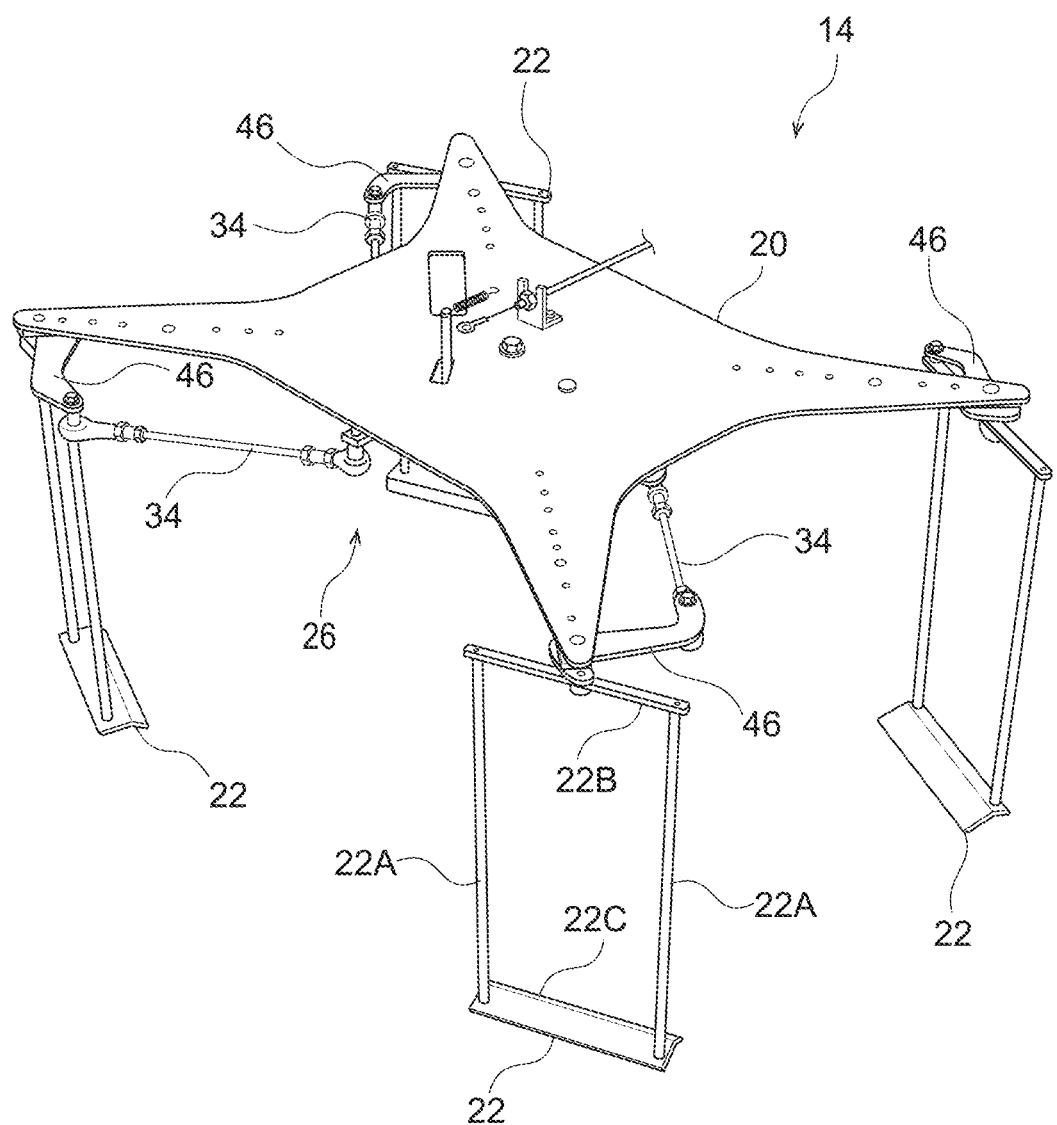
FIG. 3 is a perspective view illustrating a package supporting device.

As illustrated in FIG. 3, the plate 20 is formed in a plate shape with a vertical direction serving as a thickness direction of the plate 20, and has a substantially rectangular shape in which each side of a rectangle is curved inward when viewed from above. The leg portions 22 are respectively attached to the four corners of the plate 20.

Each of the leg portions 22 includes two abutting portions 22A with space therebetween in the horizontal direction, which is a direction orthogonal to the vertical direction, an upper connecting portion 22B connecting upper ends of the two abutting portions 22A in the horizontal direction, and a lower connecting portion 22C connecting lower ends of the two abutting portions 22A in the horizontal direction. The two abutting portions 22A are formed in a round bar shape with an axial direction thereof extending in the vertical direction. Further, the upper connecting portion 22B is formed in a plate shape extending horizontally with the vertical direction serving as a thickness direction of the upper connecting portion 22B. An upper end portion of one abutting portion 22A is fixed to one end portion of the upper connecting portion 22B, and an upper end portion of the other abutting portion 22A is fixed to the other end portion of the upper connecting portion 22B. The lower connecting portion 22C is formed in a plate shape extending in the horizontal direction with the vertical direction serving as a thickness direction of the lower connecting portion 22C. A lower end portion of one abutting portion 22A is fixed to one end portion of the lower connecting portion 22C, and a lower end portion of the other abutting portion 22A is fixed to the other end portion of the lower connecting portion 22C. As illustrated in FIG. 2, the lower connecting portion 22C is a portion that supports the package 30 from below. Further, the two abutting portions 22A are portions that support the package 30 from the sides. Note that the four leg portions 22 are configured similarly to each other.

Figure 4:
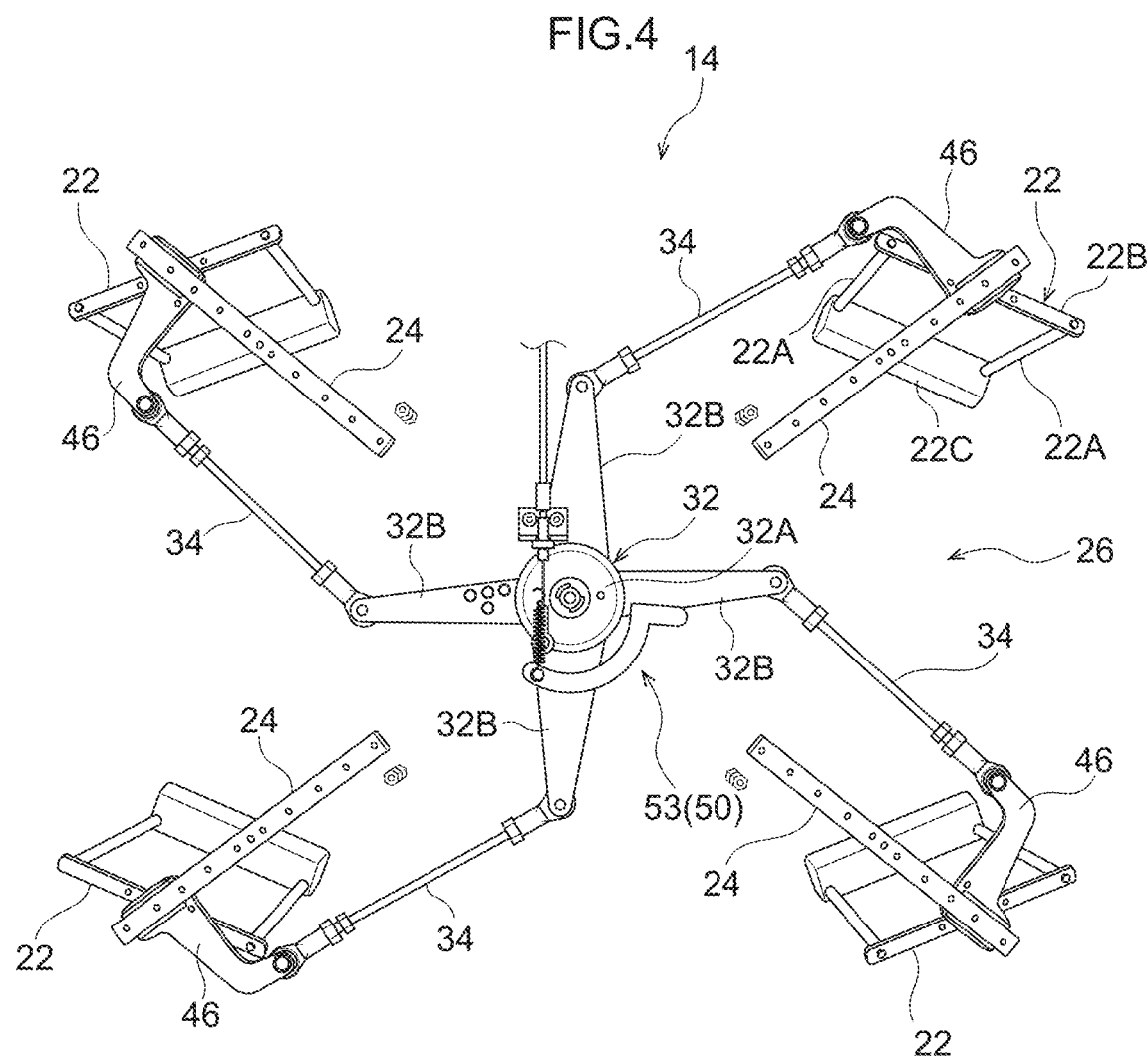
FIG. 4 is a plan view of a package supporting device, in which a plate is not illustrated, as viewed from above.

As illustrated in FIG. 3 and FIG. 4, each linear guide 24 is formed in a plate shape extending in the horizontal direction with the vertical direction serving as a thickness direction of the linear guide 24. The shape of each linear guide 24 when viewed from above is a rectangular shape. Further, the four linear guides 24 are fixed to the plate 20 in a state in which each of the linear guides is disposed at an underside of a respective one of the four corners of the plate 20. Viewing the four linear guides 24 from above, one side of each of the four linear guides 24 in the longitudinal direction is directed toward the center of the plate 20 (the center of the drawings). Each of the four leg portions 22 is supported by a respective one of the four linear guides 24 via a slide portion 42, a rotation supporting portion 44, and the like, which are described below. Each of the leg portions 22 is movable from the corner to the center of the plate 20 along a respective one of the linear guides 24, and is also movable from the center to the corner of the plate 20.

Figure 5:
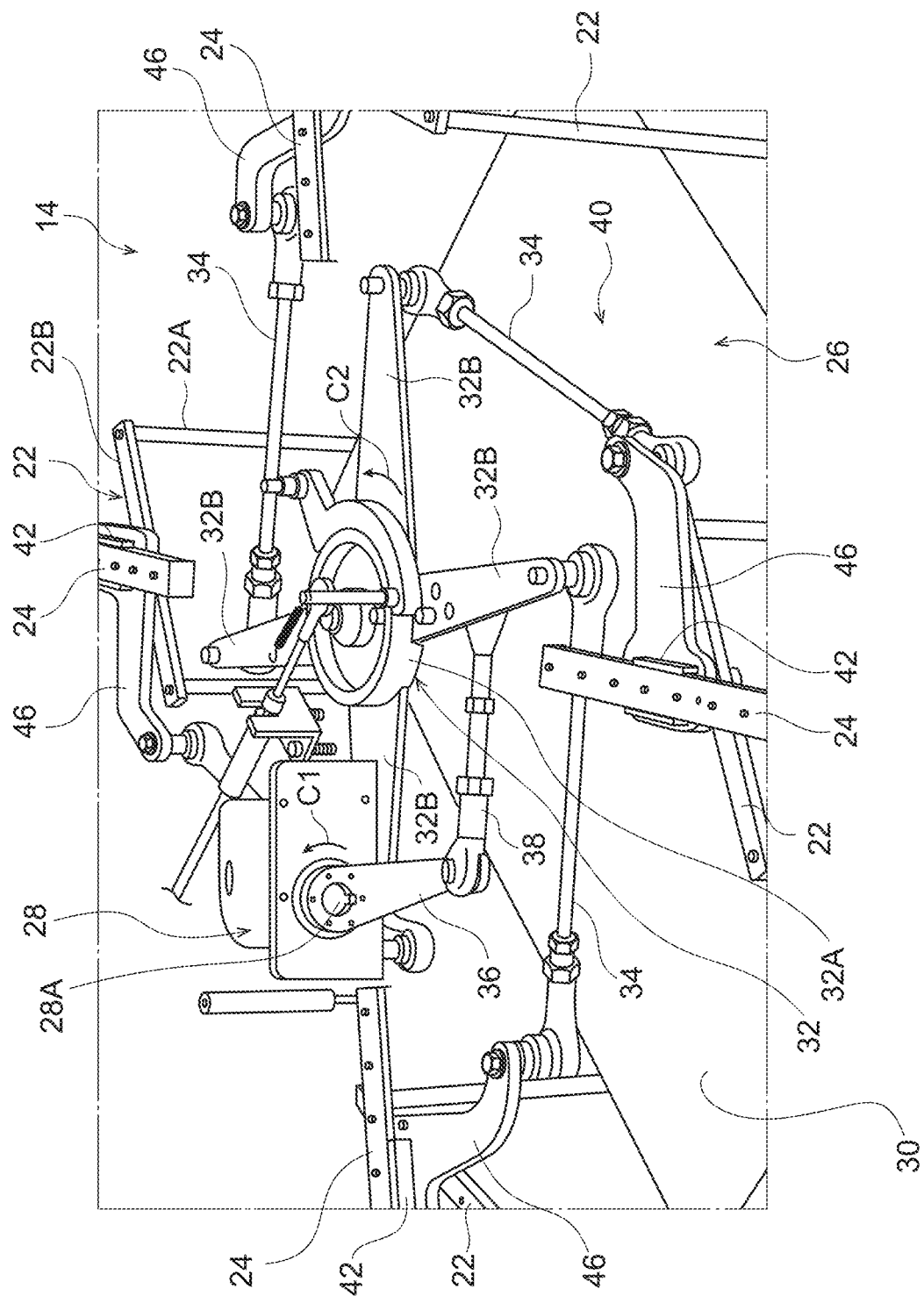
FIG. 5 is a perspective view of a package supporting device, in which a plate is not illustrated, as viewed from above.

The link mechanism 26 includes a central link 32 disposed at an underside of a central portion of the plate 20 as viewed from above, and four outer links 34 are respectively connected to the central link 32. As illustrated in FIG. 4 and FIG. 5, the central link 32 includes a rotating portion 32A that is rotatably supported by the plate 20 with the vertical direction as an axial direction, and four protruding arm portions 32B that protrude from the rotating portion 32A toward the outside of the rotating portion 32A in a radial direction of rotation. The four protruding arm portions 32B are arranged with spaces therebetween in a circumferential direction of rotation of the rotating portion 32A. An end of each of the four protruding arm portions 32B opposite to the rotating portion 32A is connected to one end of a respective one of the four outer links 34 via a ball joint. The other end of each of the four outer links 34 is connected to a respective one of four slide brackets 46, which are described below, via a ball joint.

As illustrated in FIG. 5, the actuator 28 is, for example, a motor actuator that rotates an output shaft 28A. The actuator 28 is fixed to the plate 20 in a state in which the actuator 28 is disposed on the plate 20 (see FIG. 3). A first rod 36 is fixed to the output shaft 28A of the actuator 28. The first rod 36 is inserted through an opening that is formed in the plate 20. As a result, an end portion of the first rod 36 opposite to the output shaft 28A is situated below the plate 20. One end of a second rod 38 is connected to the end of the first rod 36 opposite to the output shaft 28A via a ball joint. Moreover, the other end of the second rod 38 is connected to one of the protruding arm portions 32B of the central link 32 via a ball joint. This connects the output shaft 28A of the actuator 28 and the central link 32 together via the first rod 36 and the second rod 38. As a result, the central link 32 rotates in conjunction with the rotation of the output shaft 28A of the actuator 28. The actuator 28, the first rod 36, the second rod 38, the central link 32, and the four outer links 34 configure a drive portion 40 that moves each of the leg portions 22 toward the package 30 or away from the package 30.

Figure 6:
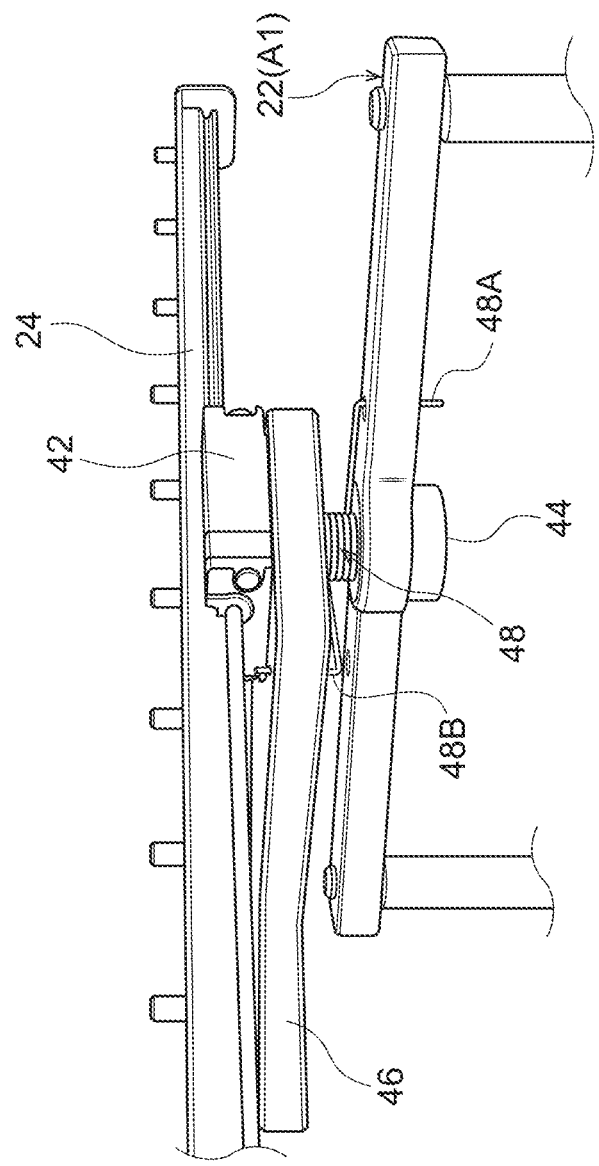
FIG. 6 is an enlarged perspective view illustrating the vicinity of a rotation supporting portion in an enlarged manner.

As described above, each of the leg portions 22 is supported by a respective one of the linear guides 24 via a slide portion 42, a rotation supporting portion 44, and the like. More specifically, as illustrated in FIG. 6, each of the leg portions 22 is supported by a respective one of the linear guides 24 via a slide portion 42, a slide bracket 46, and a rotation supporting portion 44. The slide portion 42 is engaged with the linear guide 24. The slide portion 42 is configured to slide (move) along the longitudinal direction of the linear guide 24. Further, the slide bracket 46 is fixed to a lower portion of the slide portion 42. As illustrated in FIG. 5, the other end of the outer link 34 is connected via a ball joint to an end of the slide bracket 46 opposite to the slide portion 42. The rotation supporting portion 44, serving as a second supporting portion, protrudes downward from a lower portion of the slide bracket 46. The rotation supporting portion 44 engages with a central portion in a longitudinal direction of the upper connecting portion 22B of the leg portion 22, such that the leg portion 22 is rotatably supported by the rotation supporting portion 44 with the vertical direction as an axial direction.

A rotation restricting spring 48, serving as a rotation restricting portion, is provided between the upper connecting portion 22B of each of the leg portions 22 and a respective one of the slide brackets 46. The rotation restricting spring 48 is, for example, a torsion spring. The rotation supporting portion 44 is inserted through the rotation restricting spring 48. Further, one end 48A of the rotation restricting spring 48 is engaged with a hole formed in the upper connecting portion 22B. The other end 48B of the rotation restricting spring 48 is engaged with a hole formed in the slide bracket 46. The rotation restricting spring 48 is deformed so as to allow rotation of the leg portion 22 with the vertical direction as an axial direction.

Operation and Effects of the Present Exemplary Embodiment

Next, explanation follows regarding operation and effects of the present exemplary embodiment.

As illustrated in FIG. 1 and FIG. 2, in the unmanned package transporter 10 of the present exemplary embodiment, the package supporting device 14 can support the package 30 in a state in which the ground contacting portions 18 are in contact with a landing surface (a state in which the unmanned package transporter 10 has landed).

Figure 7:
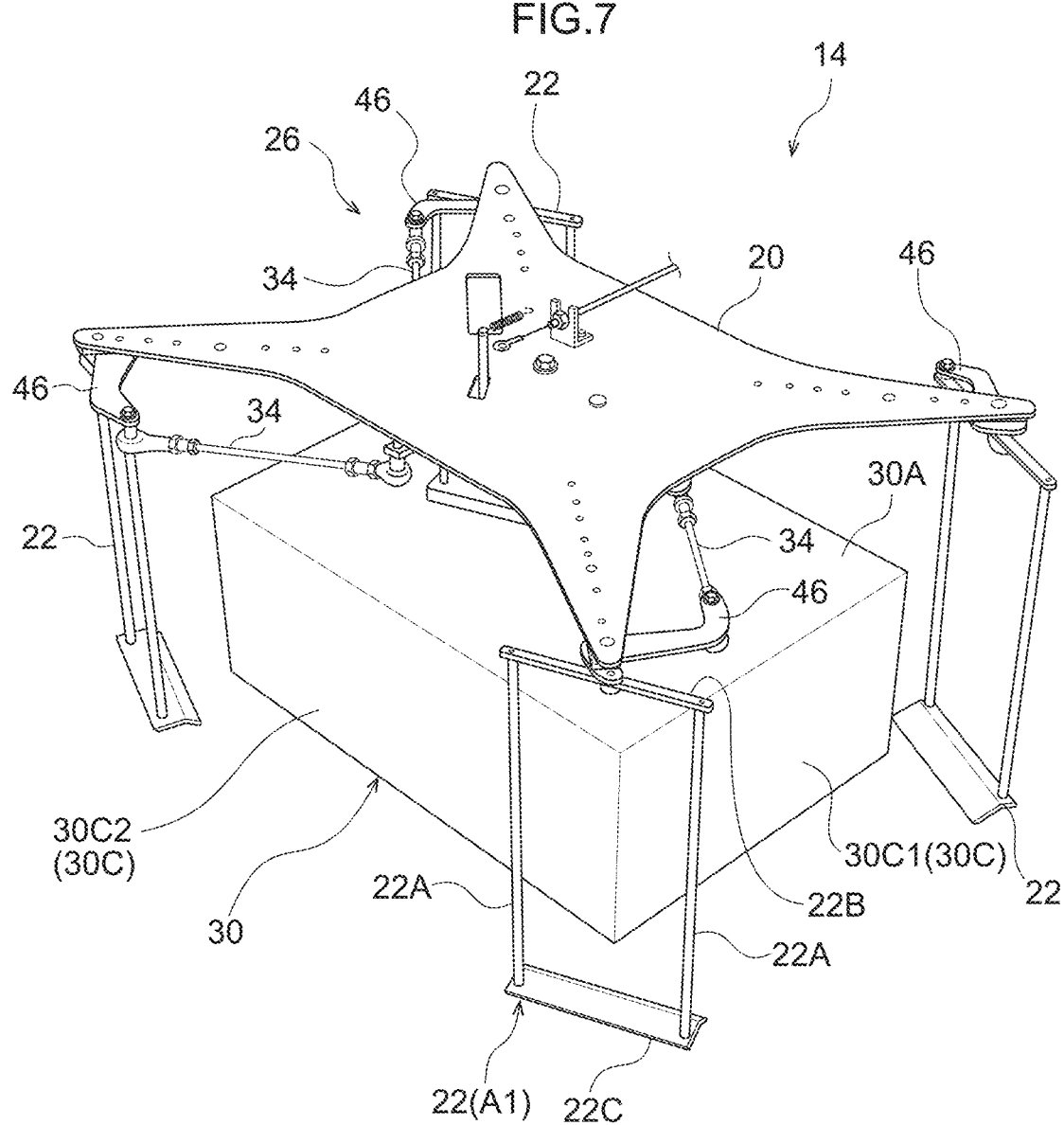
FIG. 7 is a perspective view illustrating a package supporting device and a package, and illustrates a state before respective leg portions support the package.
Figure 8:
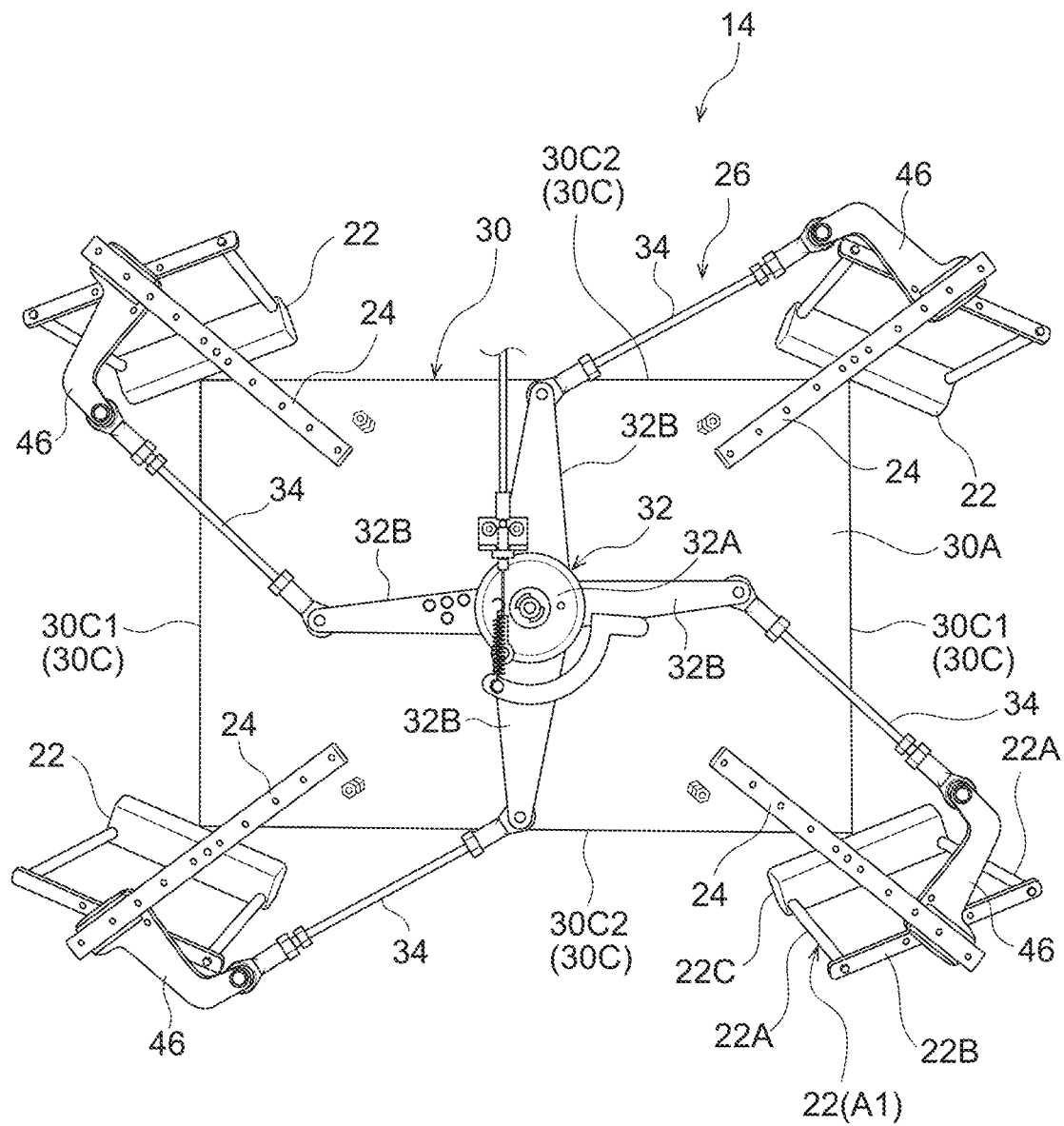
FIG. 8 is a plan view of a package supporting device and a package, in which a plate is not illustrated, as viewed from above, and illustrates a state before respective leg portions support the package.

More specifically, in the state illustrated in FIG. 7 and FIG. 8, a rectangular parallelepiped package 30 is disposed below the plate 20, and the respective leg portions 22 are not contacting the package 30. In this state, each of the leg portions 22 is maintained in an orientation determined by a respective one of the rotation restricting springs 48 (see FIG. 6). This enables unnecessary rotation of the respective leg portions 22, with the vertical direction as an axial direction, to be restricted in a state in which the respective leg portions 22 do not support the package 30. Note that the orientation of each leg portion 22 in relation to a respective one of the linear guides 24 in a state in which the respective leg portions 22 do not support the package 30 is referred to as a standard orientation A1.

Note that the package 30 includes a rectangular upper surface 30A and a rectangular lower surface 30B (see FIG. 11), and four side surfaces 30C connecting the upper surface 30A and the lower surface 30B in the vertical direction. Among the four side surfaces 30C, two side surfaces 30C having a smaller dimension in the horizontal direction are referred to as first side surfaces 30C1, and among the four side surfaces 30C, two side surfaces 30C having a dimension in the horizontal direction that is larger than the dimension in the horizontal direction of the first side surfaces 30C1 are referred to as second side surfaces 30C2. Note that the package 30 illustrated in FIG. 7 to FIG. 11 is a package with a standard aspect ratio set at a predetermined aspect ratio by a ratio (hereafter referred to as an "aspect ratio") of a dimension in a horizontal direction of the first side faces 30C1 to a dimension in a horizontal direction of the second side faces 30C2.

As illustrated in FIG. 5, when the output shaft 28A of the actuator 28 rotates to one side (in the direction of the arrow C1), and the central link 32 rotates to one side (in the direction of the arrow C2), the four outer links 34 pull the four slide brackets 46. This causes the respective leg portions 22 to move toward the package 30. Note that an operating state of the drive portion 40, which is caused by rotation of the output shaft 28A of the actuator 28 to one side (in the direction of the arrow C1), is referred to as a first state (an operating state when a package is supported).

Figure 9:
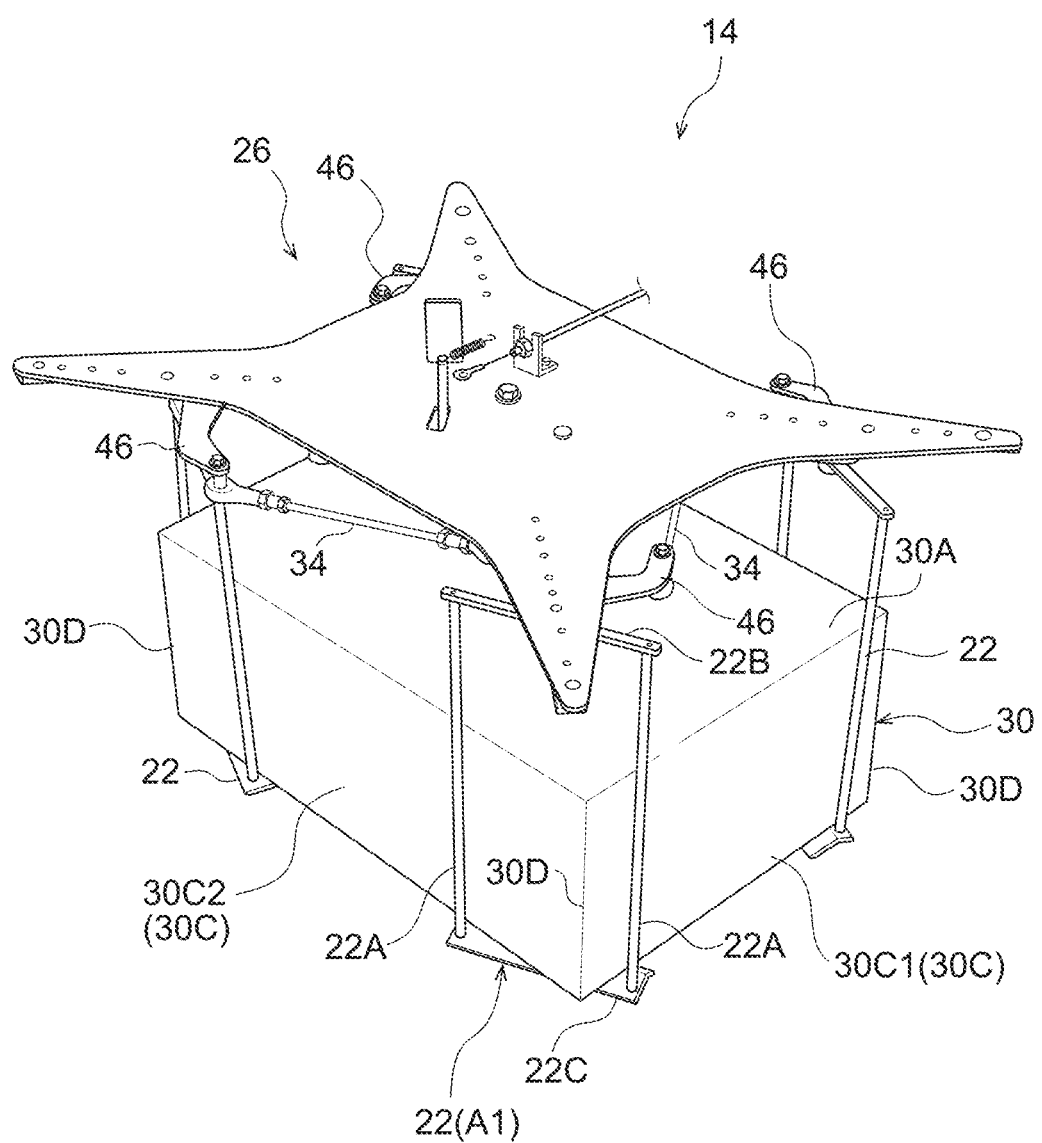
FIG. 9 is a perspective view illustrating a package supporting device and a package, and illustrates a state in which respective leg portions are supporting the package.
Figure 10:
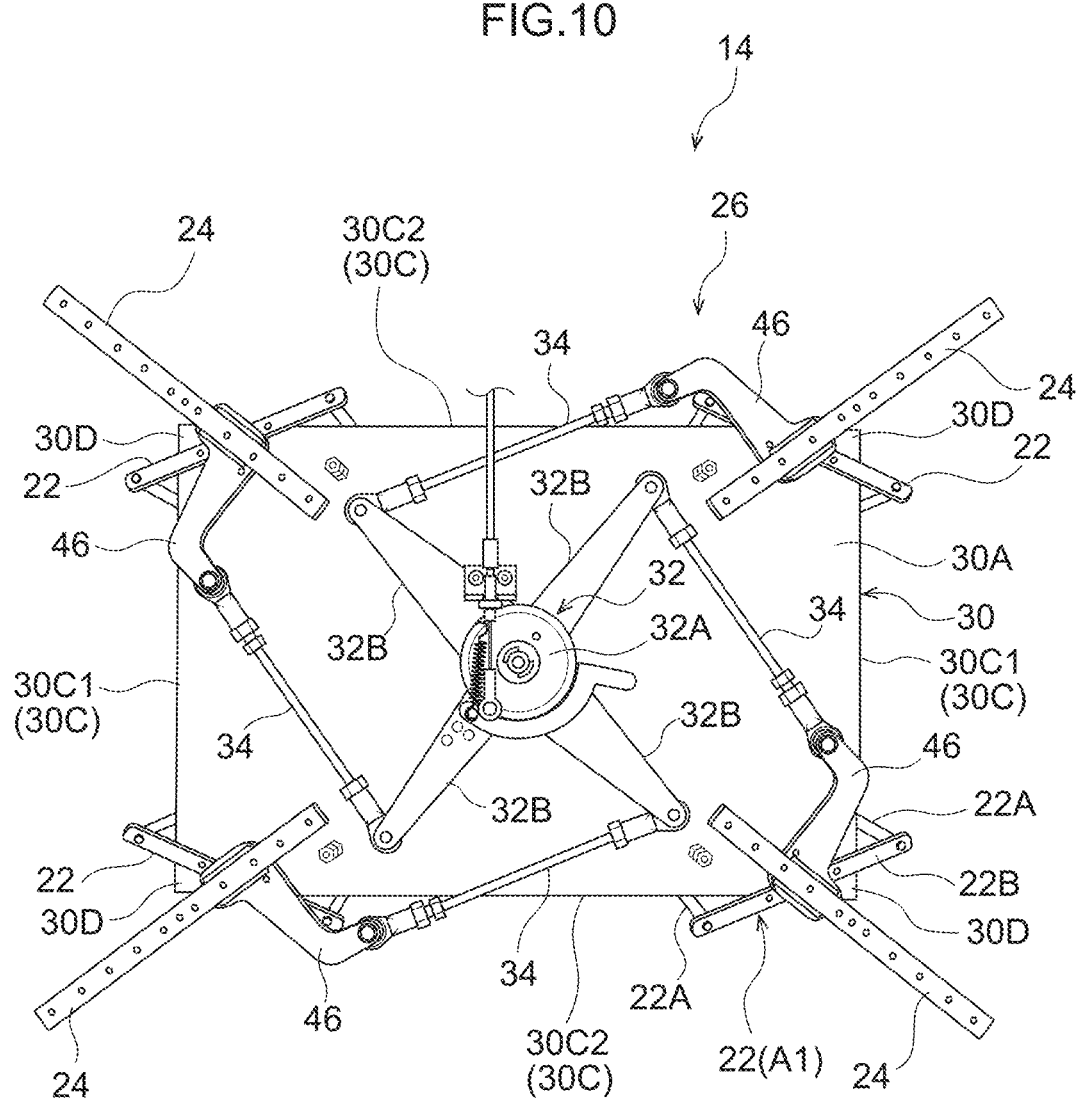
FIG. 10 is a plan view of a package supporting device and a package, in which a plate is not illustrated, as viewed from above, and illustrates a state in which respective leg portions are supporting the package.

As illustrated in FIG. 9 and FIG. 10, when each of the leg portions 22 moves toward the package 30, the two abutting portions 22A of each of the leg portions 22 abut the adjacent first side surface 30C1 and second side surface 30C2, respectively. As illustrated in FIG. 10, FIG. 11, FIG. 12, and FIG. 13, in a case in which the package 30 has a standard aspect ratio, the respective leg portions 22 are substantially prevented from rotating from the standard orientation A1. Namely, in the present exemplary embodiment, the standard orientation A1 of each of the leg portions 22 is set in accordance with the package 30 having a standard aspect ratio. Note that the package 30 is not illustrated in FIG. 12 and FIG. 13.

Figure 11:
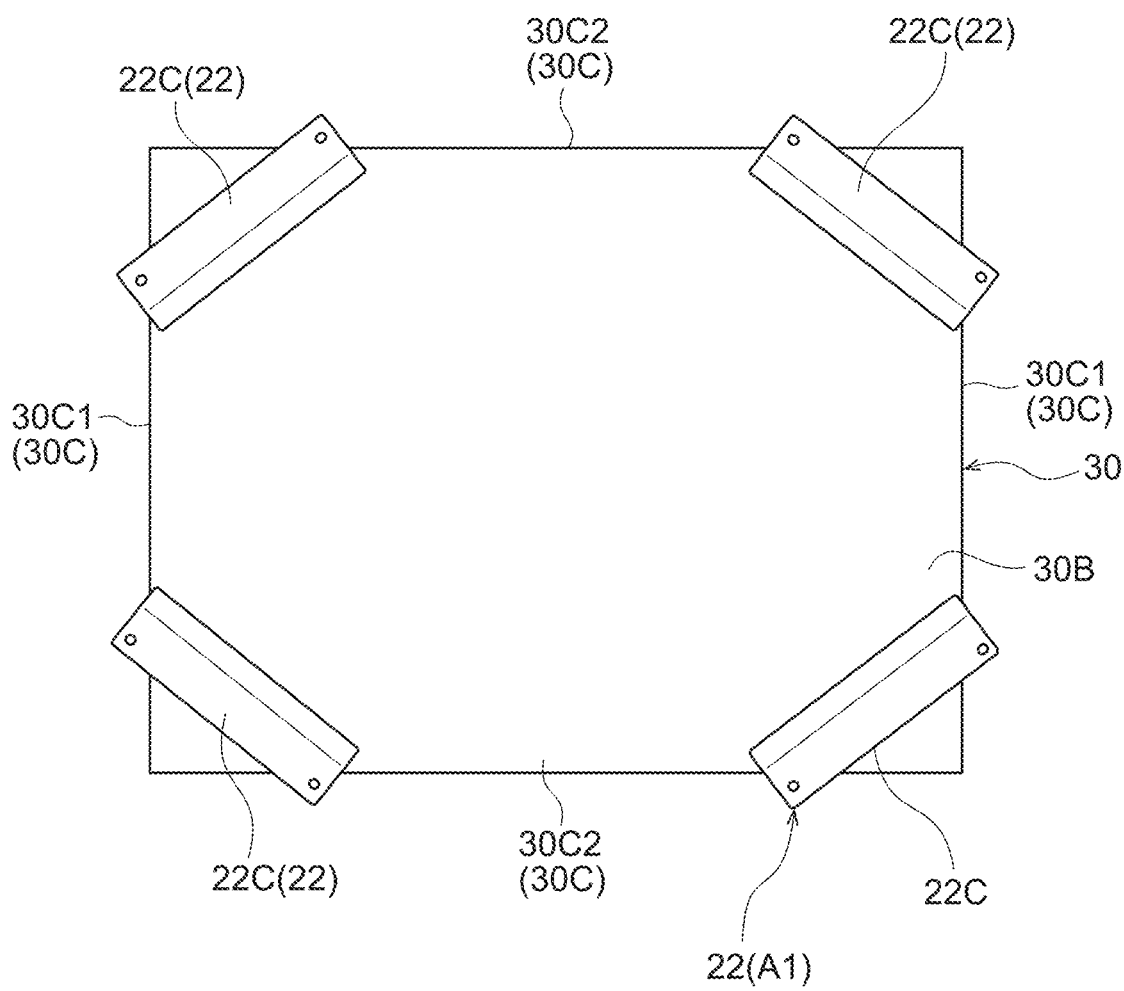
FIG. 11 is a bottom view of a package supporting device and a package, as viewed from below.
Figure 12:
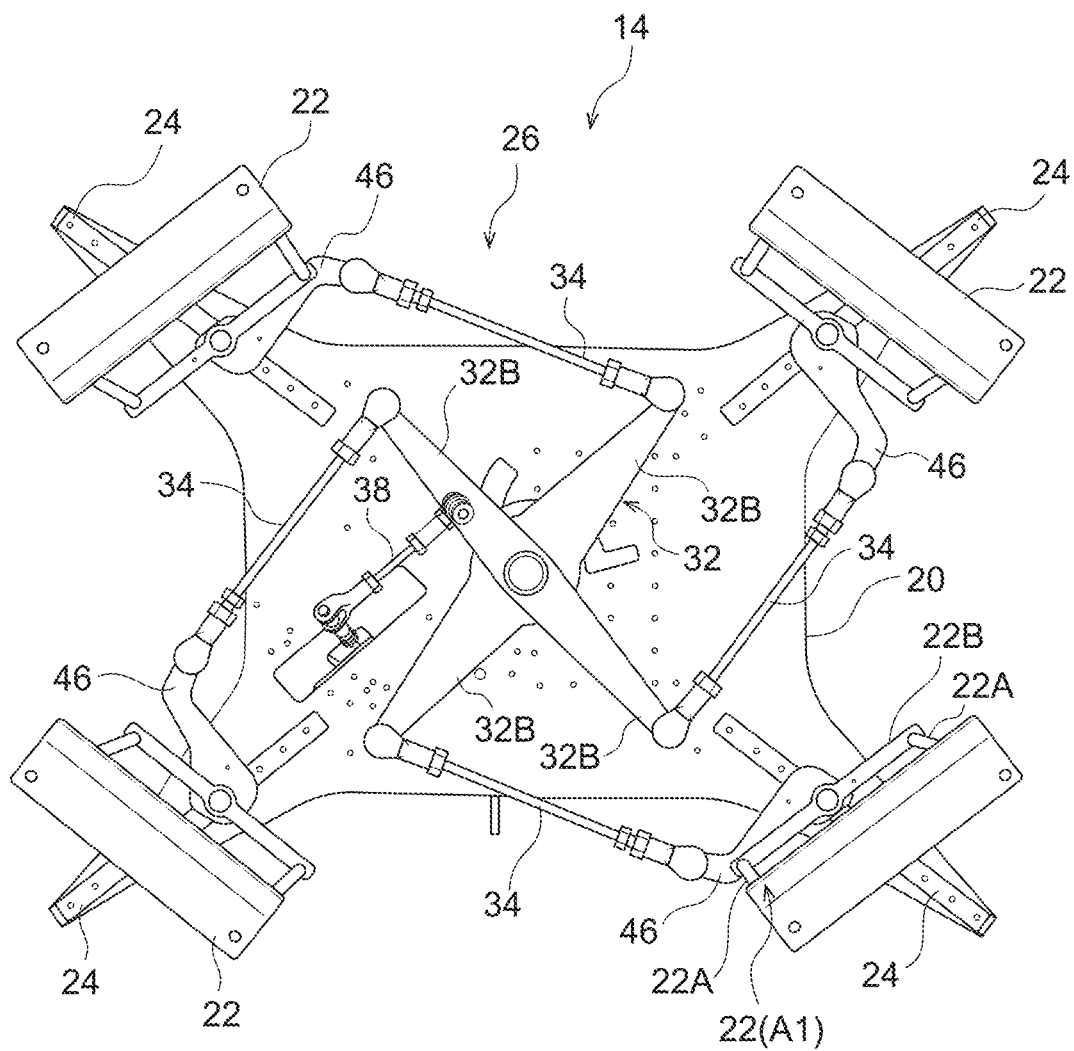
FIG. 12 is a bottom view corresponding to FIG. 11, in which a package is not illustrated.
Figure 13:
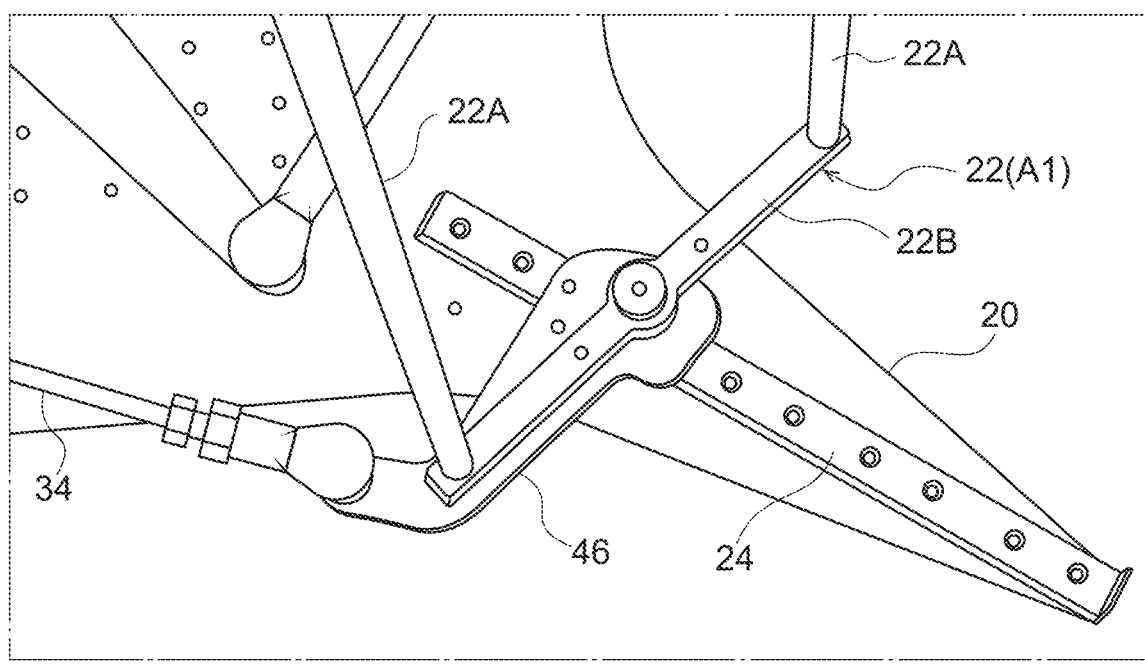
FIG. 13 is an enlarged perspective view illustrating the vicinity of a rotation supporting portion in the state of FIG. 11, in an enlarged manner.

As illustrated in FIG. 9, FIG. 11, and FIG. 12, when the two abutting portions 22A of each of the leg portions 22 abut the adjacent first side surface 30C1 and second side surface 30C2, respectively, the lower connecting portion 22C of each leg portion 22 is disposed along the lower surface 30B of the package 30. This enables the four corner portions 30D of the package 30 to be supported by the respective leg portions 22.

As illustrated in FIG. 2, when each small unmanned aerial vehicle 12 is activated, each small unmanned aerial vehicle 12 flies together with the package supporting device 14. This enables the package 30, which is supported by the package supporting device 14, to be transported by air.

Note that in a state in which the unmanned package transporter 10 has landed, as illustrated in FIG. 5, when the output shaft 28A of the actuator 28 is rotated to the other side (the side opposite to the direction of the arrow C1) and the central link 32 is rotated to the other side (the side opposite to the direction of the arrow C2), the four outer links 34 push the four slide brackets 46. This causes each of the leg portions 22 to move away from the package 30. As a result, the package 30, which is supported by the respective leg portions 22, can be unloaded from the package supporting device 14. Note that an operating state of the drive portion 40, which is caused by rotation of the output shaft 28A of the actuator 28 to the other side (the side opposite to the direction of the arrow C1), is referred to as a second state (an operating state when a package is unloaded).

Figure 14:
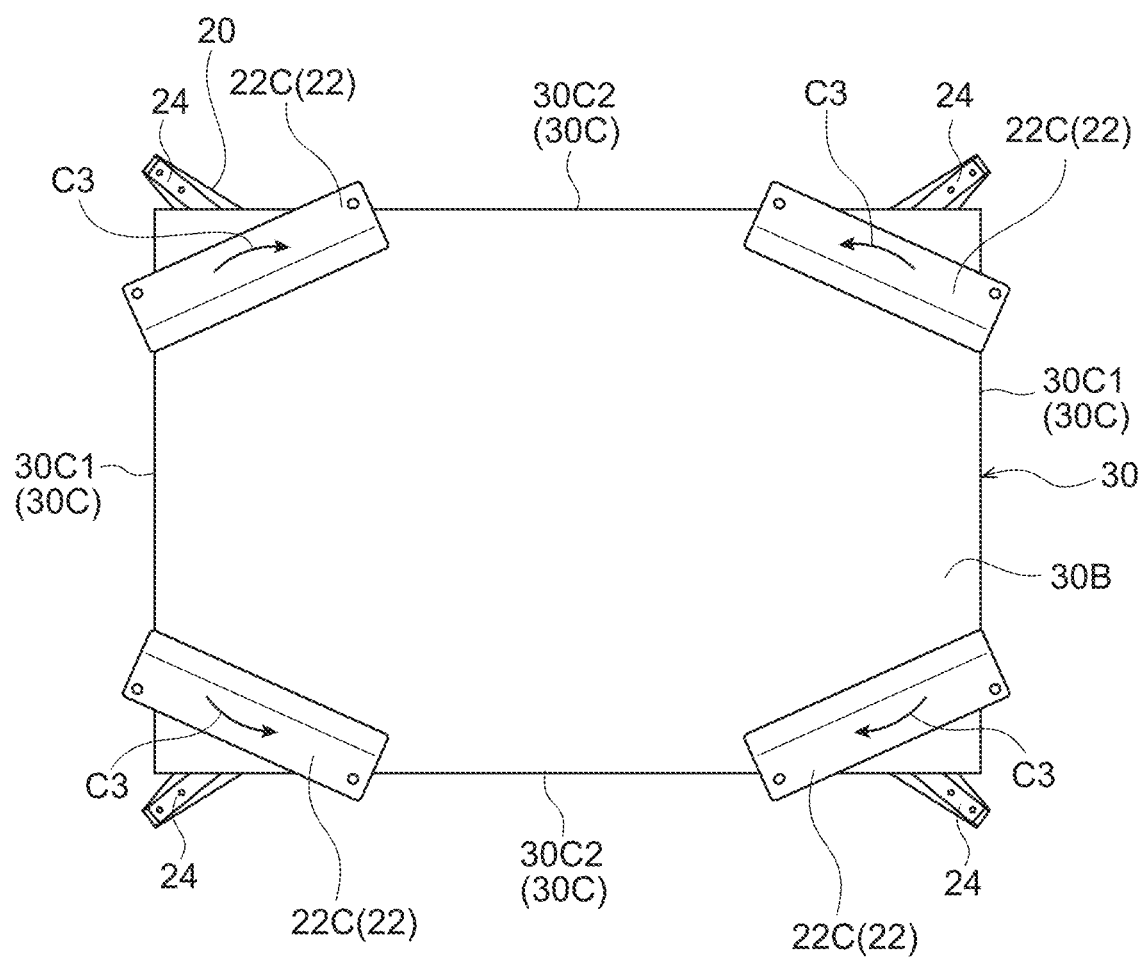
FIG. 14 is a bottom view of a package supporting device and a package, as viewed from below.

FIG. 14 shows a package 30 with a flat aspect ratio in which the dimension in the horizontal direction of the first side surfaces 30C1 is smaller than the dimension in the horizontal direction of the first side surfaces 30C1 of the package 30 with a standard aspect ratio. Explanation follows regarding movement of the respective leg portions 22 when the respective leg portions 22 support a package 30 with a flat aspect ratio.

Figure 15:
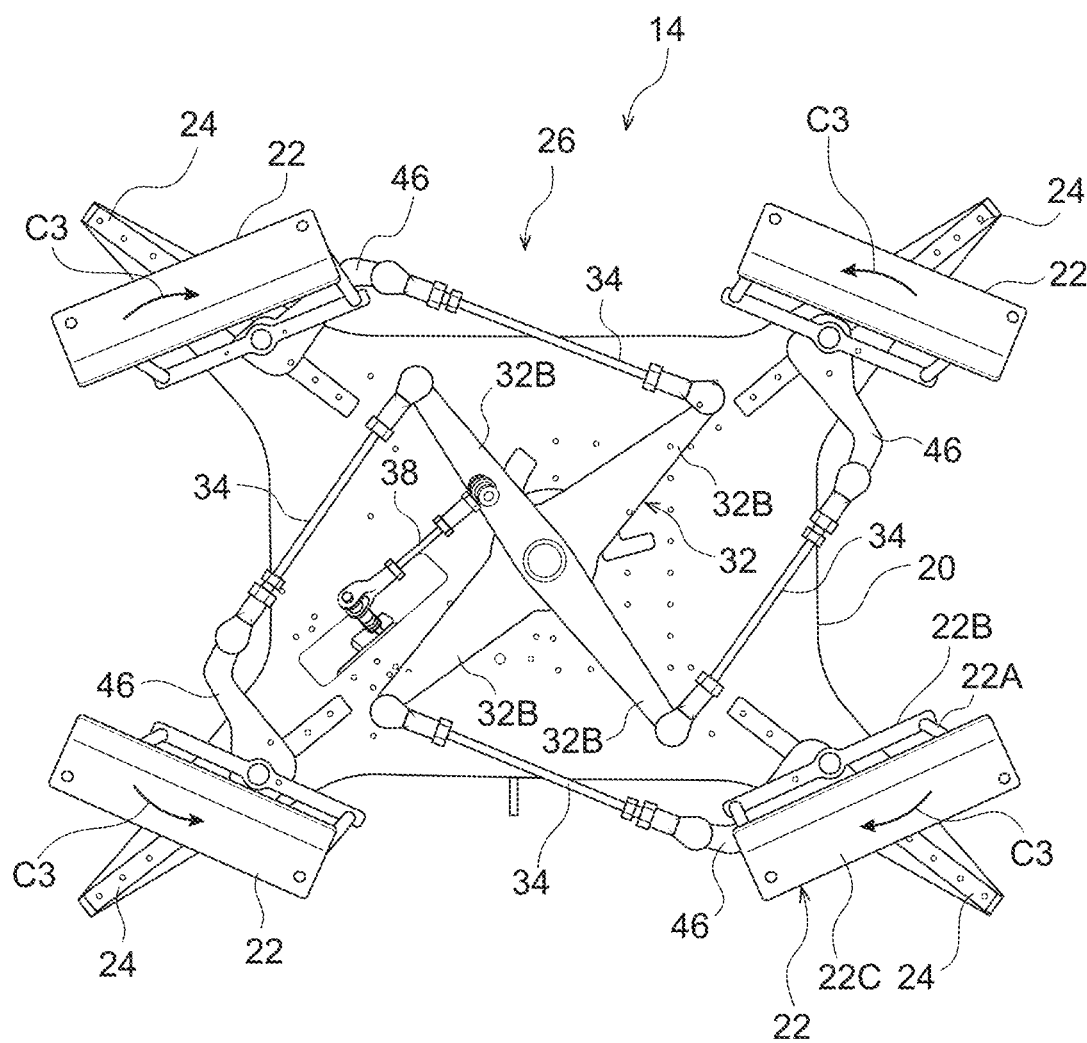
FIG. 15 is a bottom view corresponding to FIG. 14, in which a package is not illustrated.
Figure 16:
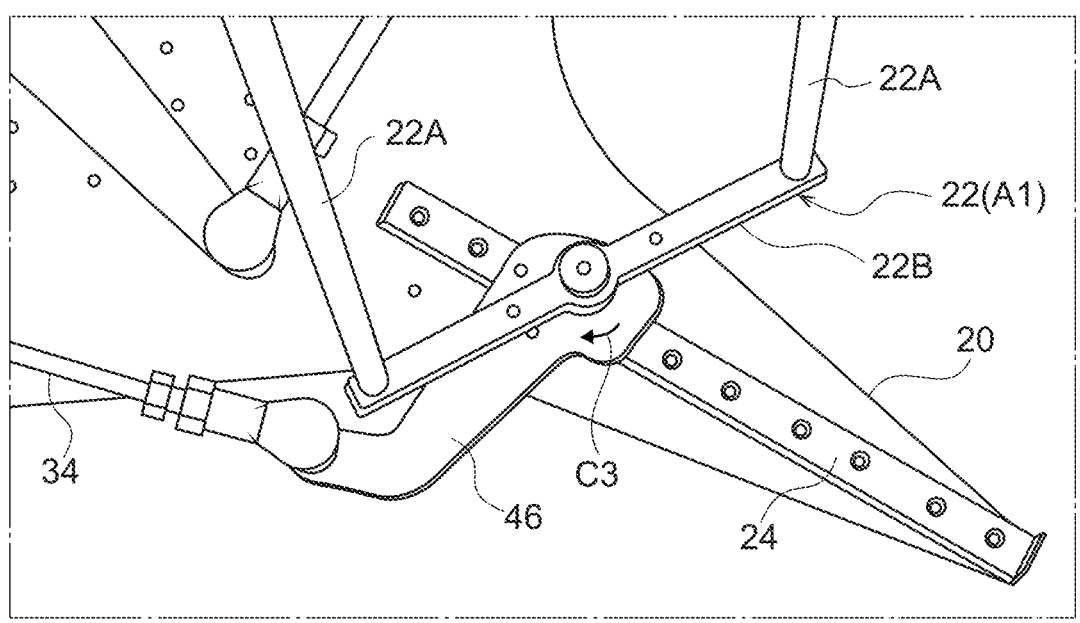
FIG. 16 is an enlarged perspective view illustrating the vicinity of a rotation supporting portion in the state of FIG. 14, in an enlarged manner.

As illustrated in FIG. 14, FIG. 15, and FIG. 16, when each of the leg portions 22 moves toward the package 30, first, one abutting portion 22A of each of the leg portions 22 abuts the first side surface 30C1. In a state in which one abutting portion 22A of each of the leg portions 22 is abutting the first side surface 30C1, further movement of the respective leg portions 22 toward the package 30 causes the respective leg portions 22 to rotate from the standard orientation A1 to one side (in the direction of the arrow C3). Note that when the respective leg portions 22 rotate from the standard orientation A1 to one side, the rotation restricting springs 48 (see FIG. 6) deform. When each of the leg portions 22 rotates from the standard orientation A1 to one side, the other abutting portion 22A of each of the leg portions 22 abuts the second side surface 30C2. When the two abutting portions 22A of the each of the leg portions 22 abut the first side surface 30C1 and the second side surface 30C2 which are adjacent to each other, the lower connecting portion 22C of each of the leg portions 22 is disposed along the lower surface 30B of the package 30 with a flat aspect ratio. This enables the four corner portions 30D of the package 30 with a flat aspect ratio to be supported by the respective leg portions 22.

As described above, the package supporting device 14 of the unmanned package transporter 10 of the present exemplary embodiment can support a package 30 of different sizes and shapes (aspect ratios).

In a state in which the four corner portions 30D of the package 30 with a flat aspect ratio are supported by the respective leg portions 22, when the respective leg portions 22 move away from the package 30 with a flat aspect ratio, the package 30 with a flat aspect ratio, which is supported by the respective leg portions 22, is unloaded from the package supporting device 14. At this time, the respective leg portions 22 are returned to the standard orientation A1 by the restoring force (biasing force) of the rotation restricting springs 48. In this manner, in the present exemplary embodiment, when the respective leg portions 22 are not contacting the package 30, the respective leg portions 22 can be returned to the standard orientation A1.

Note that although an example in which unnecessary rotation of the respective leg portions 22 is suppressed using the rotation restricting springs 48 has been described in the present exemplary embodiment, the present disclosure is not limited thereto. For example, providing a rotation restricting portion that causes friction between the upper connecting portion 22B of each of the leg portions 22 and an a respective one of the slide brackets 46 may suppress unnecessary rotation of the respective leg portions 22.

Configuration for Preventing or Suppressing Dropping of Packages During Flight

Next, explanation follows regarding a configuration for preventing or suppressing dropping of the package 30 during flight of the unmanned package transporter 10.

Figure 17:
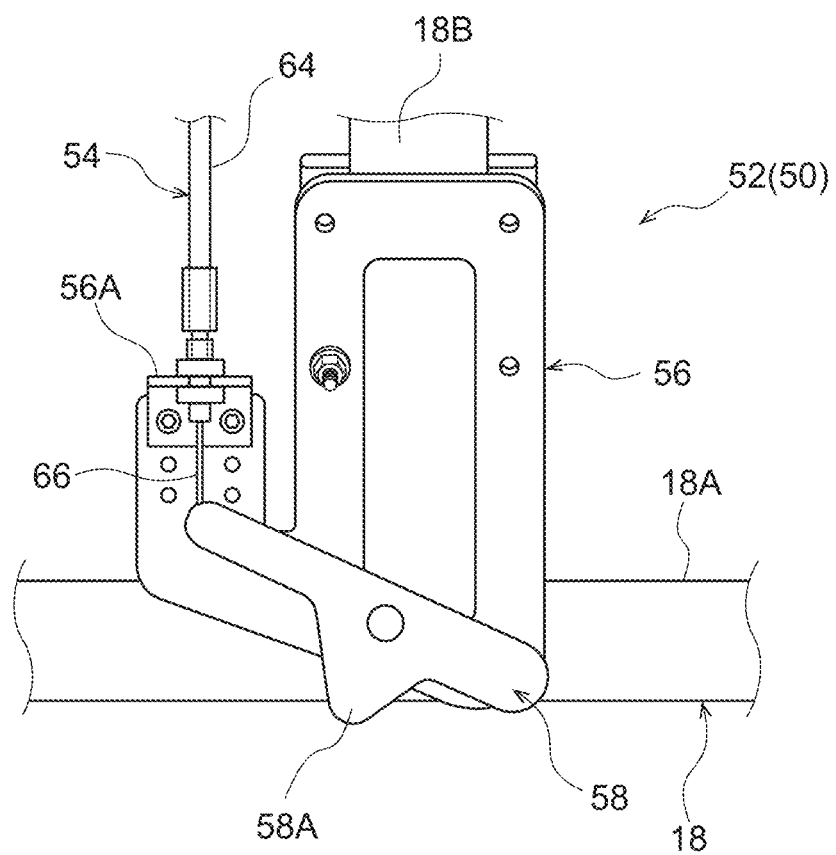
FIG. 17 is an enlarged side view illustrating a portion of a package supporting device provided with a ground-contacting-portion-side restricting portion, and illustrates a state in which an unmanned package transporter has landed.
Figure 18:
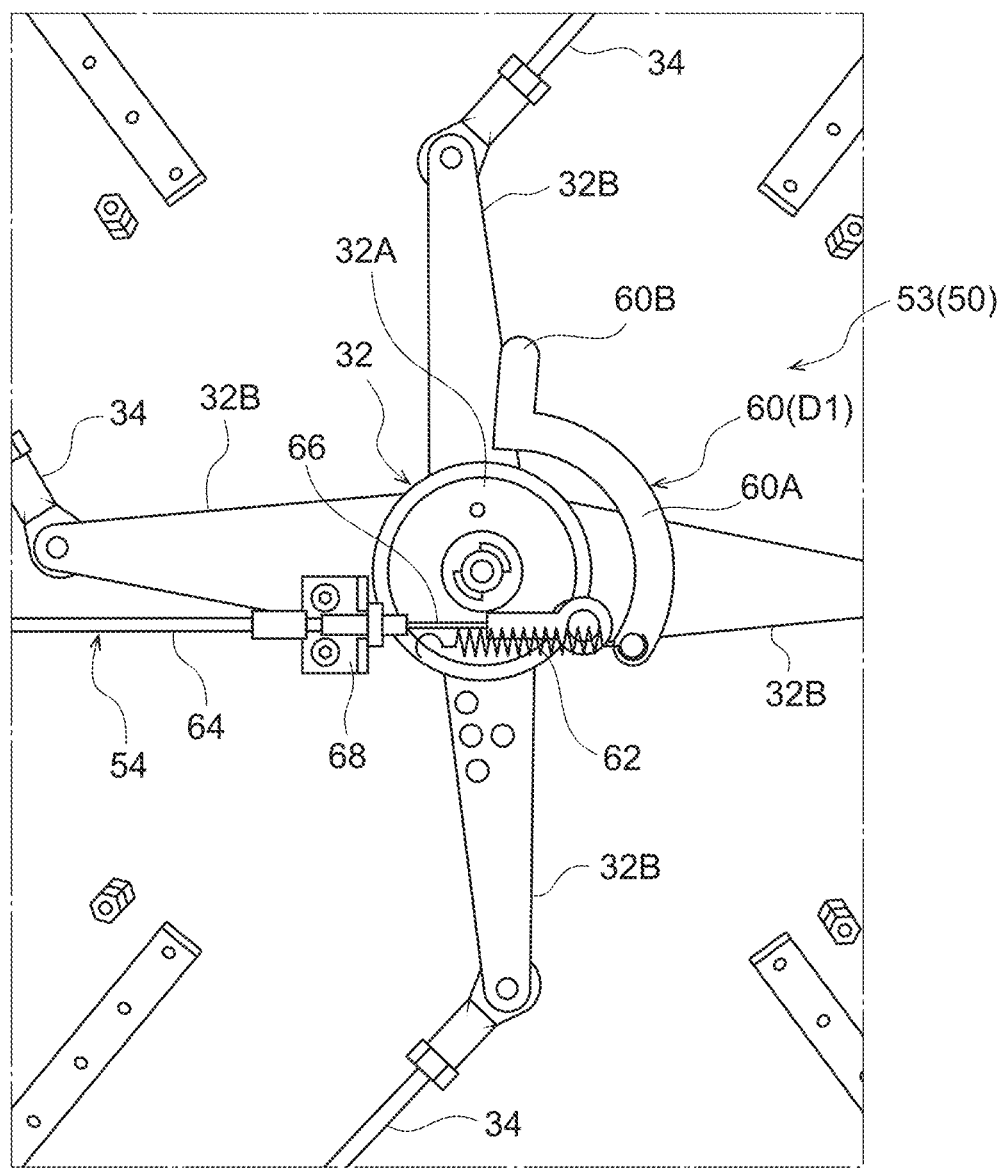
FIG. 18 is an enlarged plan view illustrating a portion of a package supporting device provided with a drive-portion-side restricting portion, and illustrates a state in which an unmanned package transporter has landed.

As illustrated in FIG. 17 and FIG. 18, the package supporting device 14 of the unmanned package transporter 10 of the present exemplary embodiment described above includes a restricting portion 50 for preventing or suppressing dropping of the package 30 during flight. The restricting portion 50 includes a ground-contacting-portion-side restricting portion 52 provided at one of the ground contacting portions 18, a drive-portion-side restricting portion 53 provided at the side of the drive portion 40, and a connecting portion 54 that connects the ground-contacting-portion-side restricting portion 52 and the drive-portion-side restricting portion 53.

As illustrated in FIG. 17, the ground-contacting-portion-side restricting portion 52 includes a base 56 fixed to a boundary portion between the ground contacting portion main body 18A and the central leg portion 18B of one of the ground contacting portions 18, and a ground contacting arm 58 that is supported by the base 56. The base 56 is provided with an outer tube locking portion 56A, to which one end portion of an outer tube 64, which is described below, is locked. One end portion of the ground contacting arm 58 is connected to a lower end portion of the base 56 via a non-illustrated pin so as to be rotatable with the horizontal direction as an axial direction. Further, one end of a cable 66, which is described below, is locked to the other end portion of the ground contacting arm 58. A protruding portion 58A protruding downward is formed at an intermediate portion between the end portion on one side and the end portion on another side of the ground contacting arm 58.

As illustrated in FIG. 18, the drive-portion-side restricting portion 53 includes a pressing arm 60 that is supported by the plate 20 (see FIG. 3). The pressing arm 60 includes a pressing portion 60A formed in a substantially C-shape as viewed from above, and a tongue-like extending portion 60B that extends from one end of the pressing portion 60A. An end of the extending portion 60B opposite to the pressing portion 60A is connected to the plate 20 (see FIG. 3) so as to be rotatable with the vertical direction as an axial direction via a non-illustrated pin. Moreover, the pressing portion 60A is disposed opposite to the rotating portion 32A of the central link 32 in a radial direction of the rotating portion 32A. At an end of the pressing portion 60A opposite to the extending portion 60B, the other end of the cable 66, which is described below, is locked. Moreover, at the end of the pressing portion 60A opposite to the extending portion 60B, one end of a pressing spring 62 serving as a biasing member is locked. The other end of the pressing spring 62 is locked by a non-illustrated pressing spring locking portion provided at the plate 20 (see FIG. 3). As a result, the pressing arm 60 is continuously urged toward the rotating portion 32A of the central link 32 by the pressing spring 62.

As illustrated in FIG. 17 and FIG. 18, the connecting portion 54 includes the outer tube 64 which is formed in a tubular shape, and the cable 66 which is inserted through the outer tube 64. As illustrated in FIG. 17, one end of the outer tube 64 is locked by the outer tube locking portion 56A which is provided at the base 56. As illustrated in FIG. 18, the other end of the outer tube 64 is locked by an outer tube locking portion 68 which is fixed to the plate 20 (see FIG. 3). As illustrated in FIG. 17, one end of the cable 66 is locked to the other end of the ground contacting arm 58. As illustrated in FIG. 18, the other end of the cable 66 is locked to the end of the pressing portion 60A of the pressing arm 60 which is opposite to the extending portion 60B.

In the present exemplary embodiment including the restricting portion 50 described above, as illustrated in FIG. 17, in a state in which the unmanned package transporter 10 is in a state of having landed, the ground contacting portion main body 18A of the ground contacting portion 18 contacts a landing surface, and the protruding portion 58A of the ground contacting arm 58 contacts the landing surface. In a state in which the protruding portion 58A of the ground contacting arm 58 is contacting a landing surface, as illustrated in FIG. 17 and FIG. 18, the cable 66 of the connecting portion 54 is in a state in which it is fed from the side of the ground-contacting-portion-side restricting portion 52 to the side of the drive-portion-side restricting portion 53. As a result, as illustrated in FIG. 18, the cable 66 is in a state in which it has pressed the pressing arm 60 toward the side opposite to the rotating portion 32A of the central link 32. As a result thereof, the pressing portion 60A of the pressing arm 60 is in a state such that it is not contacting the rotating portion 32A of the central link 32. Note that the position of the pressing arm 60 in this state is referred to as the allowing position D1, which serves as a second position. In a state in which the pressing arm 60 is positioned at the allowing position D1, since rotation of the central link 32 is not restricted by the pressing arm 60, the respective leg portions 22 can be moved toward the package 30 or away from the package 30 by actuating the drive portion 40.

Figure 19:
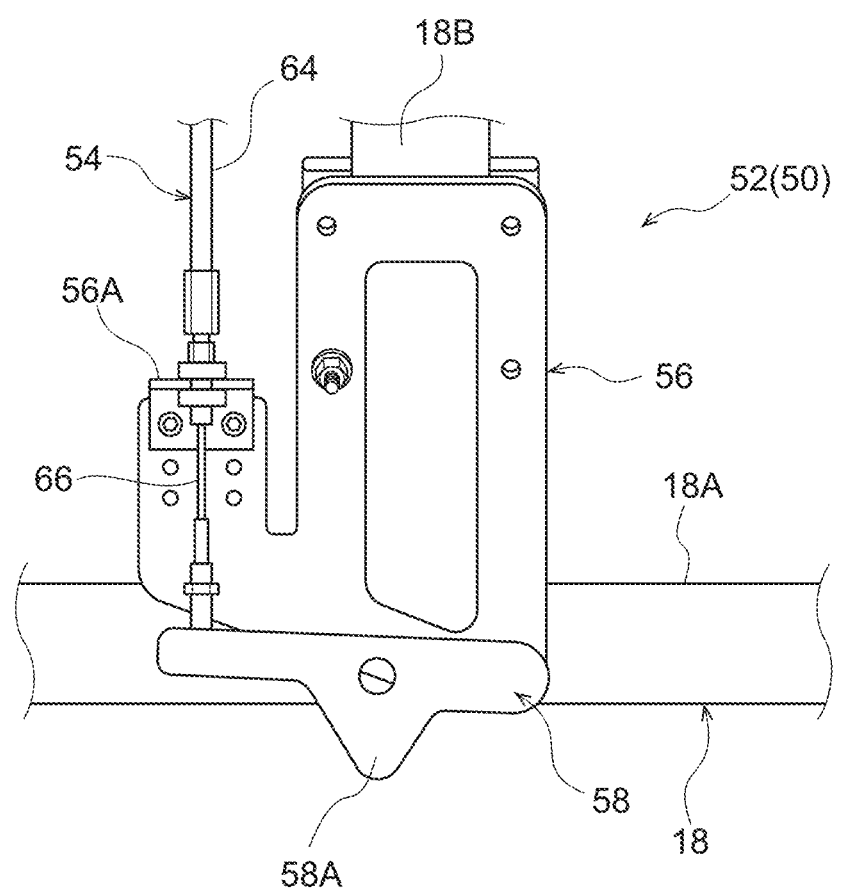
FIG. 19 is an enlarged side view illustrating a portion of a package supporting device provided with a ground-contacting-portion-side restricting portion, and illustrates a state in which an unmanned package transporter is flying.
Figure 20:
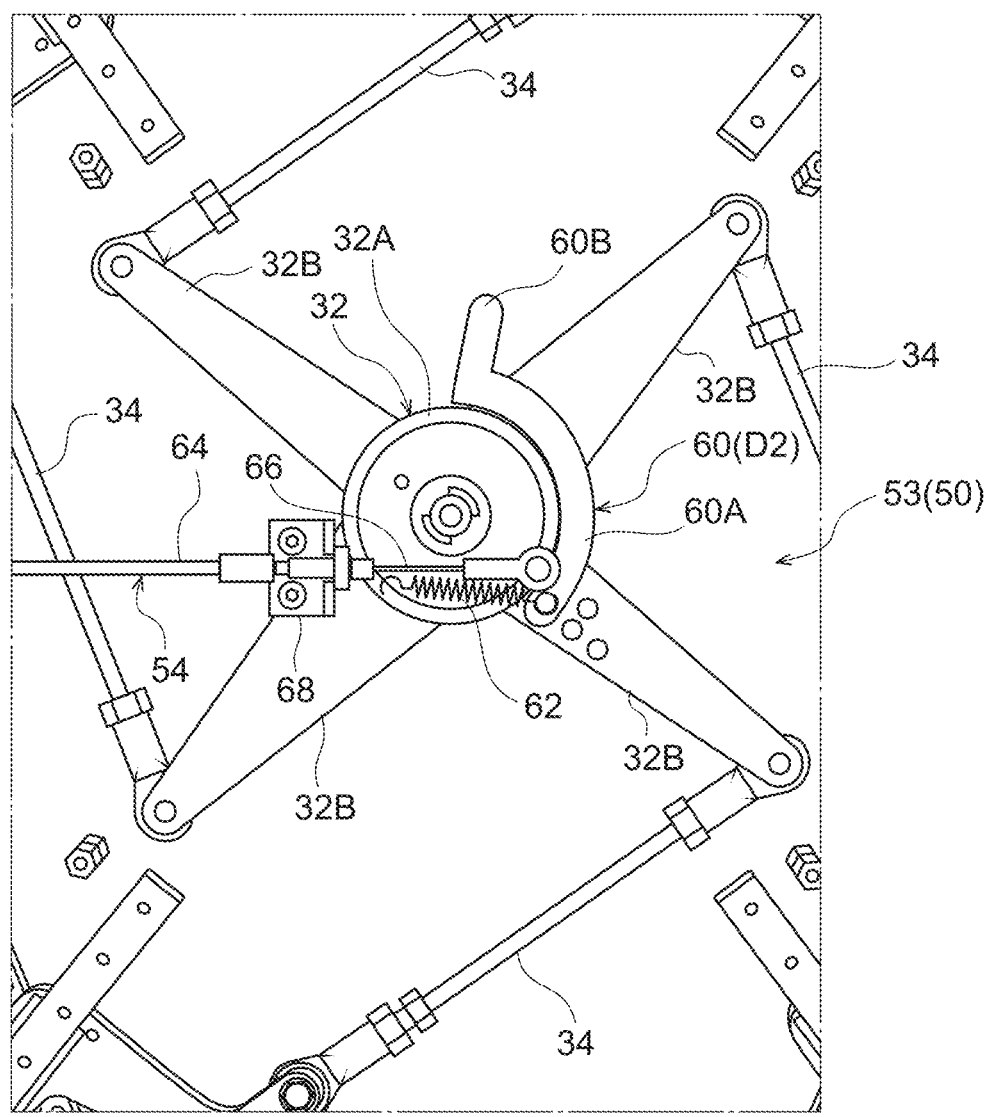
FIG. 20 is an enlarged plan view illustrating a portion of a package supporting device provided with a drive-portion-side restricting portion, and illustrates a state in which an unmanned package transporter is flying.

As illustrated in FIG. 19, in a state in which the unmanned package transporter 10 is flying, the ground contacting portion main body 18A of the ground contacting portion 18 does not contact a landing surface, and the protruding portion 58A of the ground contacting arm 58 does not contact a landing surface. In a state in which the protruding portion 58A of the ground contacting arm 58 does not contact a landing surface, as illustrated in FIG. 20, the biasing force of the pressing spring 62 causes the pressing arm 60 to move from the allowing position D1 towards the rotating portion 32A of the central link 32, and the pressing portion 60A of the pressing arm 60 is in a state in which it is pressed against the rotating portion 32A of the central link 32. Note that the position of the pressing arm 60 in this state is referred to as a restricting position D2, which serves as a first position. In a state in which the pressing arm 60 is positioned at the restricting position D2, rotation of the central link 32 is restricted by the pressing arm 60, and therefore, each of the leg portions 22 cannot be moved towards the package 30 or away from the package 30 even if the drive portion 40 is actuated. This enables dropping of the package 30 during flight of the unmanned package transporter 10 to be prevented or suppressed.

Moreover, in the present exemplary embodiment, the pressing spring 62 is configured to continuously bias the pressing arm 60 toward the restricting position D2. This enables dropping of the package 30 during flight of the unmanned package transporter 10 to be prevented or suppressed even if, for example, an operational failure arises at the ground-contacting-portion-side restricting portion 52 or the like.

Further, in the present exemplary embodiment, the restricting portion 50 is provided independently from the drive portion 40. This enables dropping of the package 30 during flight of the unmanned package transporter 10 to be prevented or suppressed, while eliminating the need to separately control the drive portion 40 and the like.

Moreover, as in the restricting portion 50 of the present exemplary embodiment, a configuration in which an actuator, a controller, or an electric system is not required enables an increase in weight of the package supporting device 14 to be suppressed due to the provision of the restricting portion 50. This enables a reduction in the load capacity of the unmanned package transporter 10 to be suppressed.

Restricting Portion 70 to which a Ratchet Mechanism is Applied

Figure 21:
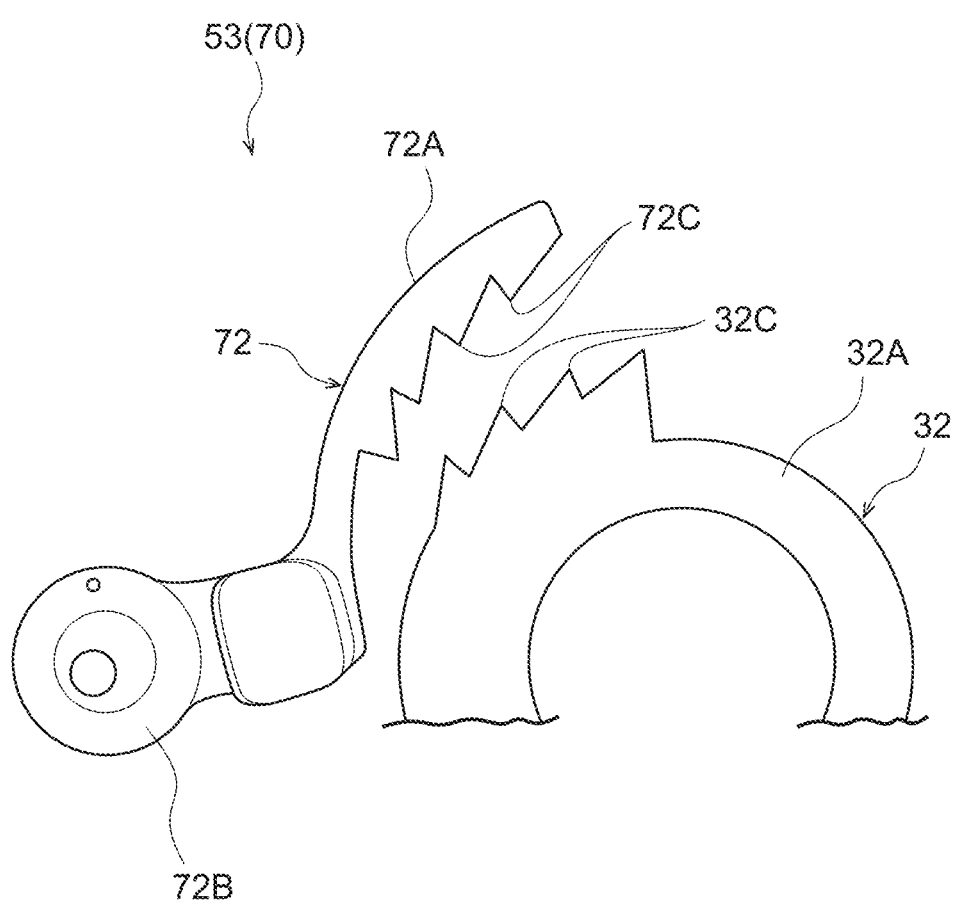
FIG. 21 is a plan view schematically illustrating another form of a restricting portion, and illustrates a state in which plural first ratchet teeth and plural second ratchet teeth are separated from each other.
Figure 22:
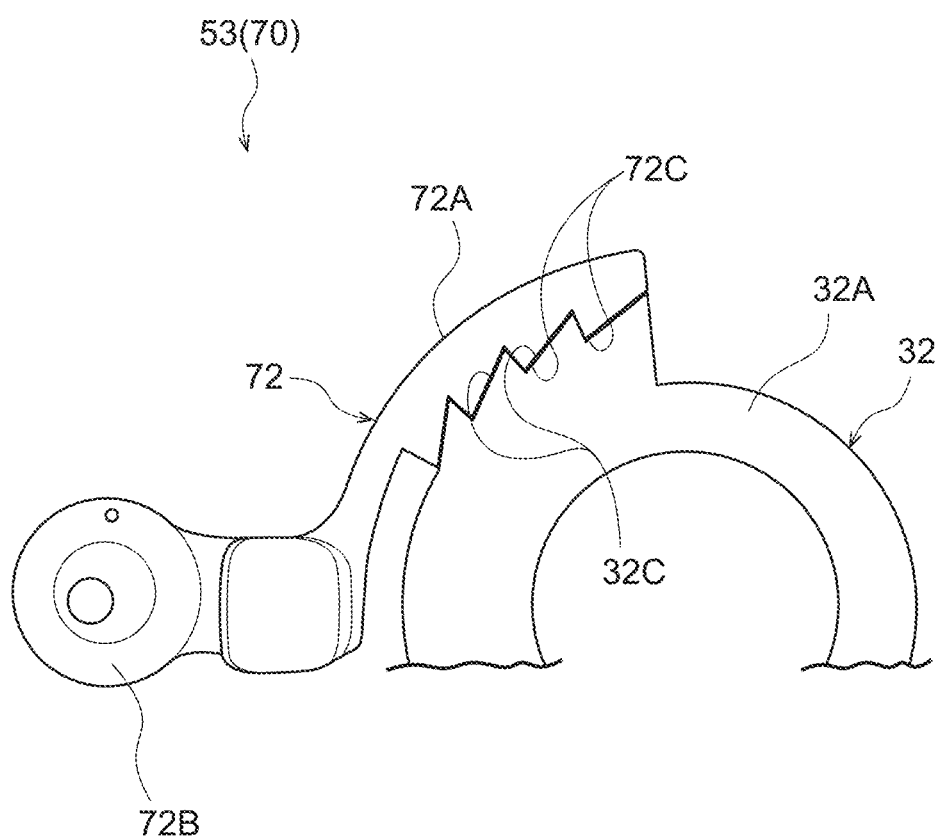
FIG. 22 is a plan view schematically illustrating a restricting portion of another aspect, and illustrates a state in which plural first ratchet teeth and plural second ratchet teeth are engaged with each other.

Next, explanation follows regarding a restricting portion 70 to which a ratchet mechanism is applied, with reference to FIG. 21 and FIG. 22.

As illustrated in FIG. 21, the restricting portion 70, to which a ratchet mechanism is applied, is configured similarly to the restricting portion 50 of the above-described exemplary embodiment, with the exception of the configuration of the drive-portion-side restricting portion 53 and the central link 32 being different. Accordingly, explanation follows regarding the configuration of the drive-portion-side restricting portion 53 and the central link 32, while explanation regarding the ground-contacting-portion-side restricting portion 52 and the connecting portion 54 is omitted. Further, members and portions that have already been described are allocated the same reference numerals as those already described, and explanation thereof is omitted.

The drive-portion-side restricting portion 53 includes a ratchet arm 72 that is supported by the plate 20 (see FIG. 3). The ratchet arm 72 includes a curved portion 72A that is curved in an arcuate shape when viewed from above, and a tongue-like extending portion 72B that extends from one end of the curved portion 72A. An end of the extending portion 72B opposite to the curved portion 72A is connected to the plate 20 (see FIG. 3) so as to be rotatable with the vertical direction as an axial direction, via a non-illustrated pin. The curved portion 72A is disposed opposite to the rotating portion 32A of the central link 32 in the radial direction of the rotating portion 32A. Further, at an end of the extending portion 72B on a curved portion 72A side, the other end of the cable 66 (see FIG. 18) is locked. Moreover, one end of the pressing spring 62 (see FIG. 18) is locked to an end of the extending portion 72B on the curved portion 72A side. As a result, the ratchet arm 72 is continuously bias toward the rotating portion 32A of the central link 32 by the pressing spring 62. Moreover, the ratchet arm 72 includes plural first ratchet teeth 72C that protrude from the curved portion 72A toward the rotating portion 32A of the central link 32. The plural first ratchet teeth 72C are formed in a sawtooth shape.

The central link 32 includes plural second ratchet teeth 32C that protrude from an outer peripheral surface of the rotating portion 32A toward the ratchet arm 72. The plural second ratchet teeth 32C are formed in a sawtooth shape.

In the configuration including the restricting portion 70 described above, in a state in which the unmanned package transporter 10 has landed, the cable 66 is in a state in which it has pressed the ratchet arm 72 toward the side opposite to the rotating portion 32A of the central link 32. As a result, the plural first ratchet teeth 72C of the ratchet arm 72 are in a state of being separated from the plural second ratchet teeth 32C of the central link 32. Note that the position of the ratchet arm 72 in this state is referred to as the allowing position D1, which serves as a second position. In a state in which the ratchet arm 72 is positioned at the allowing position D1, since rotation of the central link 32 is not restricted by the ratchet arm 72, the respective leg portions 22 can be moved toward the package 30 or away from the package 30 by actuating the drive portion 40.

As illustrated in FIG. 22, in a state in which the unmanned package transporter 10 is flying, the biasing force of the pressing spring 62 causes the ratchet arm 72 to move from the allowing position D1 toward the rotating portion 32A of the central link 32, and also causes the plural first ratchet teeth 72C of the ratchet arm 72 to be in a state in which they are engaged with the plural second ratchet teeth 32C of the central link 32. Note that the position of the ratchet arm 72 in this state is referred to as a restricting position D2, which serves as a first position. In a state in which the ratchet arm 72 is positioned at the restricting position D2, rotation of the central 32 link 32 to the other side (opposite to the direction of the arrow C2) is restricted by the ratchet arm 72, and therefore, each of the leg portions 22 cannot be moved away from the package 30 even if the drive portion 40 is actuated. This enables dropping of the package 30 during flight of the unmanned package transporter 10 to be prevented or suppressed.

On the other hand, when the drive portion 40 is actuated so as to rotate the central link 32 to one side (in the direction of the arrow C2) in a state in which the ratchet arm 72 is positioned at the restricting position D2, the plural second ratchet teeth 32C of the central link 32 move over the plural first ratchet teeth 72C of the ratchet arm 72. In this manner, the restricting portion 70 described above can allow operation of the drive portion 40 in a state in which the respective leg portions 22 are moved toward the package 30

Restricting Portion 74 to which a Cam Mechanism is Applied

Figure 23:
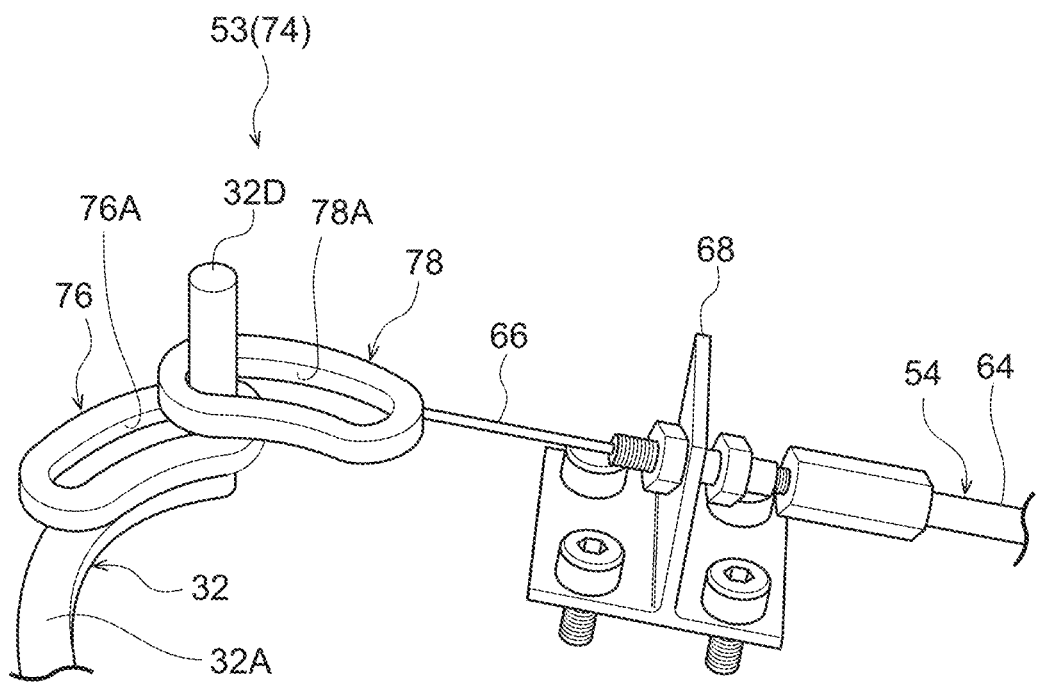
FIG. 23 is a perspective view schematically illustrating a restricting portion of another aspect, and illustrates a state in which movement of an insertion portion is restricted by a fixed cam portion and a movable cam portion.
Figure 24:
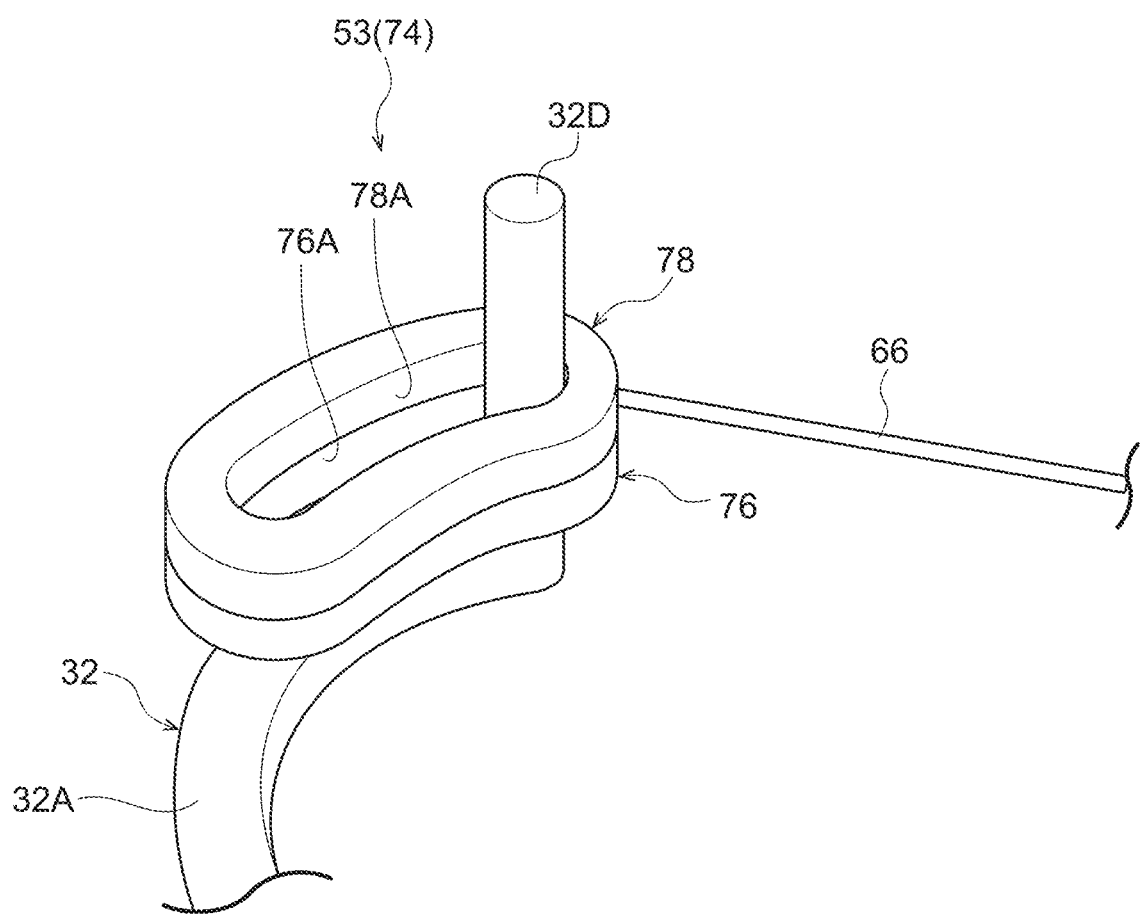
FIG. 24 is a perspective view schematically illustrating a restricting portion of another aspect, and illustrates a state in which an insertion portion is movable along a fixed cam portion and a movable cam portion.
Figure 25:
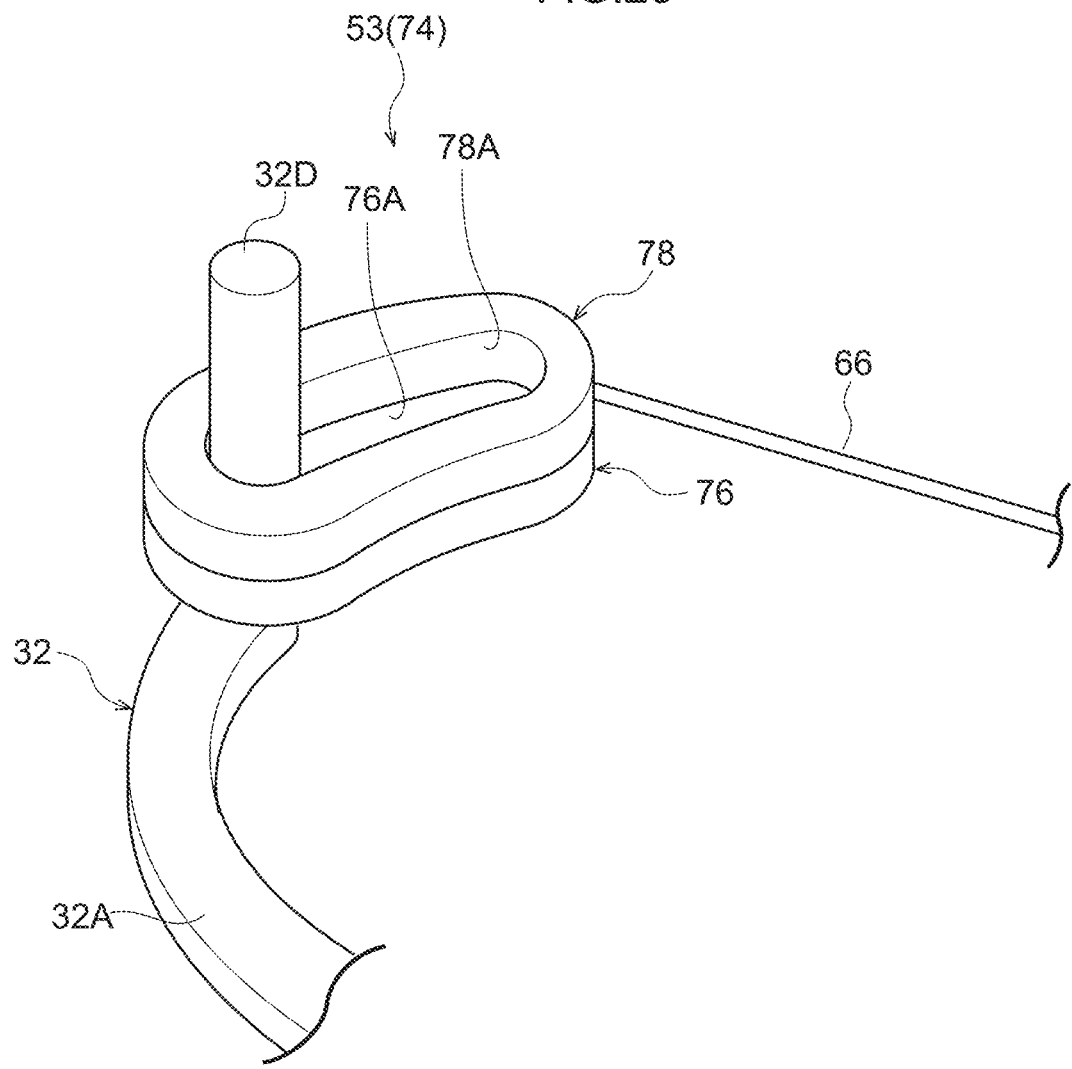
FIG. 25 is a perspective view schematically illustrating a restricting portion of another aspect, and illustrates a state in which an insertion portion is movable along a fixed cam portion and a movable cam portion.

Next, explanation follows regarding a restricting portion 74 to which a cam mechanism is applied, with reference to FIG. 23, FIG. 24, and FIG. 25.

As illustrated in FIG. 23, the restricting portion 74 to which a cam mechanism is applied is configured similarly to the restricting portion 50 of the above-described exemplary embodiment, with the exception of the configuration of the drive-portion-side restricting portion 53 and the central link 32 being different. Accordingly, explanation follows regarding the configuration of the drive-portion-side restricting portion 53 and the central link 32, while explanation regarding the ground-contacting-portion-side restricting portion 52 and the connecting portion 54 is omitted. Further, members and portions that have already been described are allocated the same reference numerals as those already described, and explanation thereof is omitted.

The drive-portion-side restricting portion 53 includes a fixed cam portion 76 that is non-movable with respect to the plate 20 (see FIG. 3), and a movable cam portion 78 that is connected to the connecting portion 54 and is displaceable with respect to the plate 20. Moreover, the drive-portion-side restricting portion 53 includes an insertion portion 32D that protrudes from the rotating portion 32A of the central link 32 and that is inserted through the fixed cam portion 76 and the movable cam portion 78.

The fixed cam portion 76 is formed in an elliptical shape when viewed from above. A fixed cam hole 76A, having an elongated hole shape, is formed in the fixed cam portion 76. Note that the fixed cam portion 76 is fixed to a non-illustrated fixed cam fixing portion provided at the plate 20 (see FIG. 3).

The movable cam portion 78 is configured similarly to the fixed cam portion 76, and is formed in an elliptical shape when viewed from above. A movable cam hole 78A, having an elongated hole shape, is formed in the movable cam portion 78. Note that the movable cam portion 78 is supported by a non-illustrated movable cam support portion provided at the plate 20 (see FIG. 3). This enables the movable cam portion 78 to be movable in a predetermined orientation within a predetermined range. Moreover, one end of the pressing spring 62 is locked to the movable cam portion 78. As a result, the movable cam portion 78 is continuously bias toward the side opposite to the fixed cam portion 76.

The insertion portion 32D protrudes upward from an upper surface of the rotation portion 32A of the central link 32 and is formed in a column shape. The insertion portion 32D is inserted through the fixed cam hole 76A of the fixed cam portion 76 and the movable cam hole 78A of the movable cam portion 78.

In the configuration including the restricting portion 74 described above, in a state in which the unmanned package transporter 10 has landed, as illustrated in FIG. 24 and FIG. 25, the cable 66 is in a state in which it has pressed the movable cam portion 78 toward the fixed cam portion 76. As a result, the movable cam portion 78 is disposed at a position at which the position of the movable cam portion 78 in the horizontal direction and the position of the fixed cam portion 76 in the horizontal direction coincide with each other. Note that the position of the movable cam portion 78 in this state is referred to as the allowing position D1, which serves as the second position. In a state in which the movable cam portion 78 is positioned at the allowing position D1, the insertion portion 32D is able to move along the fixed cam hole 76A of the fixed cam portion 76 and the movable cam hole 78A of the movable cam portion 78. That is, rotation of the central link 32 is not restricted by the fixed cam portion 76 or the movable cam portion 78. Accordingly, by actuating the drive portion 40, the respective leg portions 22 can be moved toward the package 30 or away from the package 30.

On the other hand, in a state in which the unmanned package transporter 10 is flying, as illustrated in FIG. 23, the movable cam portion 78 is moved from the allowing position D1 to the side opposite to the fixed cam portion 76 by the biasing force of the pressing spring 62, and the insertion portion 32D of the central link 32 is held between the inner edge of the fixed cam hole 76A of the fixed cam portion 76 and the inner edge of the movable cam hole 78A of the movable cam portion 78. Note that the position of the movable cam portion 78 in this state is referred to as a restricting position D2, which serves as a first position. In a state in which the movable cam portion 78 is positioned at the restricting position D2, the insertion portion 32D cannot move along the fixed cam hole 76A of the fixed cam portion 76 or the movable cam hole 78A of the movable cam portion 78. That is, rotation of the central link 32 is restricted by the fixed cam portion 76 and the movable cam portion 78. Accordingly, even if the drive portion 40 is actuated, the respective leg portions 22 cannot be moved toward the package 30 or away from the package 30. This enables dropping of the package 30 during flight of the unmanned package transporter 10 to be prevented or suppressed.

Although explanation has been given regarding exemplary embodiments of the present disclosure, the present disclosure is not limited to the above description, and obviously various other modifications may be implemented within a range that does not depart from the gist of the present disclosure.

What is claimed is:

1. A package supporting device comprising:
    a base, an upper portion of the base being configured to be attached to an unmanned aerial vehicle;
    a plurality of ground contacting portions that are configured to contact a landing surface in a state of having landed;
    a plurality of package supporting portions provided at an underside of the base, the package supporting portions supporting a package;
    a drive portion, the drive portion being operable in a first state to cause each of the package supporting portions to move toward the package, and the drive portion being operable in a second state to cause each of the package supporting portions to move away from the package; and
    a restricting portion, the restricting portion being provided independently from the drive portion, the restricting portion being configured to allow operation of the drive portion in a state in which the ground contacting portions are contacting a landing surface, and, in a state in which the ground contacting portions do not contact a landing surface, to restrict operation of the drive portion in at least the second state, wherein the restricting portion includes:
        a drive-portion-side restricting portion, the drive-portion-side restricting portion being displaceable between a first position that restricts operation of the drive portion in at least the second state, and a second position that allows operation of the drive portion,
        a ground-contacting-portion-side restricting portion, the ground-contacting-portion-side restricting portion being provided at one of the ground contacting portions, and
        a connecting portion, the connecting portion connecting the drive-portion-side restricting portion and the ground-contacting-portion-side restricting portion;
    in a case in which the ground-contacting-portion-side restricting portion contacts a landing surface, the connecting portion displaces, and the drive-portion-side restricting portion displaces from the first position to the second position; and
    in a case in which the ground-contacting-portion-side restricting portion does not contact a landing surface, the connecting portion displaces, and the drive-portion-side restricting portion displaces from the second position to the first position.

2. The package supporting device according to claim 1, further comprising a biasing member, the biasing member continuously biasing the drive-portion-side restricting portion toward the first position.

3. The package supporting device according to claim 1, wherein:
    the drive-portion-side restricting portion includes a pressing portion, the pressing portion being pressed against a member configuring the drive portion in a state in which the drive-portion-side restricting portion is positioned at the first position; and
    operation of the drive portion is restricted by the pressing portion being pressed against the member configuring the drive portion.

4. The package supporting device according to claim 1, wherein:
    the drive-portion-side restricting portion includes a plurality of first ratchet teeth, the plurality of first ratchet teeth protruding toward the drive portion;
    the drive portion includes a plurality of second ratchet teeth, the plurality of second ratchet teeth protruding toward the drive-portion-side restricting portion and engaging with the plurality of first ratchet teeth of the drive-portion-side restricting portion positioned at the first position;
    in a state in which the plurality of first ratchet teeth and the plurality of second ratchet teeth are engaged with each other, operation of the drive portion in the second state is restricted; and
    in a case in which the drive portion is in the first state in the state in which the plurality of first ratchet teeth and the plurality of second ratchet teeth are engaged with each other, operation of the drive portion in the first state is allowed by the plurality of second ratchet teeth moving over the plurality of first ratchet teeth.

5. The package supporting device according to claim 1, wherein:
    the drive-portion-side restricting portion includes:
        a fixed cam portion, the fixed cam portion being non-movable with respect to the base,
        a movable cam portion, the movable cam portion being connected to the connecting portion, and the movable cam portion being displaceable with respect to the base, and
        an insertion portion, the insertion portion protruding from the drive portion, and the insertion portion being inserted through the fixed cam portion and the movable cam portion;
    in a state in which the movable cam portion is disposed at a position at which movement of the insertion portion is restricted by the fixed cam portion and the movable cam portion, operation of the drive portion is restricted; and in a state in which the movable cam portion is disposed at a position at which the insertion portion is movable along the fixed cam portion and the movable cam portion, operation of the drive portion is allowed.

6. An unmanned package transporter comprising:

an unmanned aerial vehicle;

a base, the unmanned aerial vehicle being attached to an upper portion of the base;

a plurality of ground contacting portions, the plurality of ground contacting portions being configured to contact a landing surface in a state of having landed;

a plurality of package supporting portions, the plurality of package supporting portions being provided at an underside of the base, and the plurality of package supporting portions supporting a package;

a drive portion, the drive portion being operable in a first state to cause each of the package supporting portions to move toward the package, and the drive portion being operable in a second state to cause each of the package supporting portions to move away from the package; and a restricting portion, the restricting portion being provided independently from the drive portion, the restricting portion being configured to allow operation of the drive portion in a state in which the ground contacting portions are contacting a landing surface, and, in a state in which the ground contacting portions do not contact a landing surface, to restrict operation of the drive portion in at least the second state, wherein the restricting portion includes:

a drive-portion-side restricting portion, the drive-portion-side restricting portion being displaceable between a first position that restricts operation of the drive portion in at least the second state, and a second position that allows operation of the drive portion, a ground-contacting-portion-side restricting portion, the ground-contacting-portion-side restricting portion being provided at one of the ground contacting portions, and a connecting portion, the connecting portion connecting the drive-portion-side restricting portion and the ground-contacting-portion-side restricting portion;

in a case in which the ground-contacting-portion-side restricting portion contacts a landing surface, the connecting portion displaces, and the drive-portion-side restricting portion displaces from the first position to the second position; and in a case in which the ground-contacting-portion-side restricting portion does not contact a landing surface, the connecting portion displaces, and the drive-portion-side restricting portion displaces from the second position to the first position.

* * * * *